US005599117A

United States Patent [19]
Faes et al.

[11] Patent Number: 5,599,117
[45] Date of Patent: Feb. 4, 1997

[54] AIRLINE TICKET PRINTER WITH TICKET PRESTAGING

[75] Inventors: Steven M. Faes, New Market; Alfred L. Fulton; Martin J. Hnetynka, both of Huntsville; Laird Campbell, Laceys Spring; David Preston, Huntsville; Michael Missios, Huntsville; Scott D. Sampson, Huntsville, all of Ala.

[73] Assignee: Sci Systems, Inc., Huntsville, Ala.

[21] Appl. No.: 235,497

[22] Filed: Apr. 29, 1994

Related U.S. Application Data

[62] Division of Ser. No. 934,361, Aug. 25, 1992, Pat. No. 5,309,176.

[51] Int. Cl.⁶ ............................. B41J 11/50; B65H 3/44
[52] U.S. Cl. ........................ 400/605; 271/9.13; 101/66
[58] Field of Search ............................ 400/605, 624, 400/625, 629; 271/9, 9.01, 9.05, 9.06, 9.13; 101/66; 235/384, 475

[56] References Cited

U.S. PATENT DOCUMENTS

| | | | |
|---|---|---|---|
| 3,595,561 | 7/1971 | Leblant | 271/9 |
| 4,806,948 | 2/1989 | Bangs et al. | 346/76 PH |
| 4,827,841 | 5/1989 | White, Sr. | 400/605 |
| 4,851,864 | 7/1989 | Fulton et al. | 346/159 |
| 4,857,945 | 8/1989 | Faes | 346/160.1 |
| 4,911,566 | 3/1990 | Imaseki et al. | 400/120 HE |
| 4,924,240 | 5/1990 | Herbert et al. | 346/1.1 |
| 4,928,133 | 5/1990 | Fulton | 346/150 |
| 4,958,171 | 9/1990 | Fulton et al. | 346/153.1 |
| 4,962,393 | 10/1990 | Fulton et al. | 346/150 |
| 4,980,704 | 12/1990 | Fulton et al. | 346/153.1 |
| 5,014,073 | 5/1991 | Sone et al. | 346/76 PH |
| 5,037,216 | 8/1991 | Nubson et al. | 400/120 HE |
| 5,091,738 | 2/1992 | Fulton et al. | 346/154 |
| 5,168,286 | 12/1992 | Okauchi et al. | 346/76 PH |
| 5,268,561 | 12/1993 | Kimura et al. | 235/384 |

*Primary Examiner*—David A. Wiecking
*Attorney, Agent, or Firm*—Curtis, Morris & Safford, P.C.; Gregor N. Neff

[57] ABSTRACT

An airline ticket printer includes a magnetic reading and writing station that has a read/write head for recording information on, or reproducing information from, a magnetic stripe carried on a ticket. The printer also includes a printing station located after the magnetic read/write head. A plurality of separate storage bins are provided for storing different ticket blanks; each bin has its own feed device. The ticket blanks are prefed from the storage bins along separate guide paths to separate staging areas prior to these paths joining to form a common path. The magnetic read/write head and the printer are located along this common path.

5 Claims, 23 Drawing Sheets

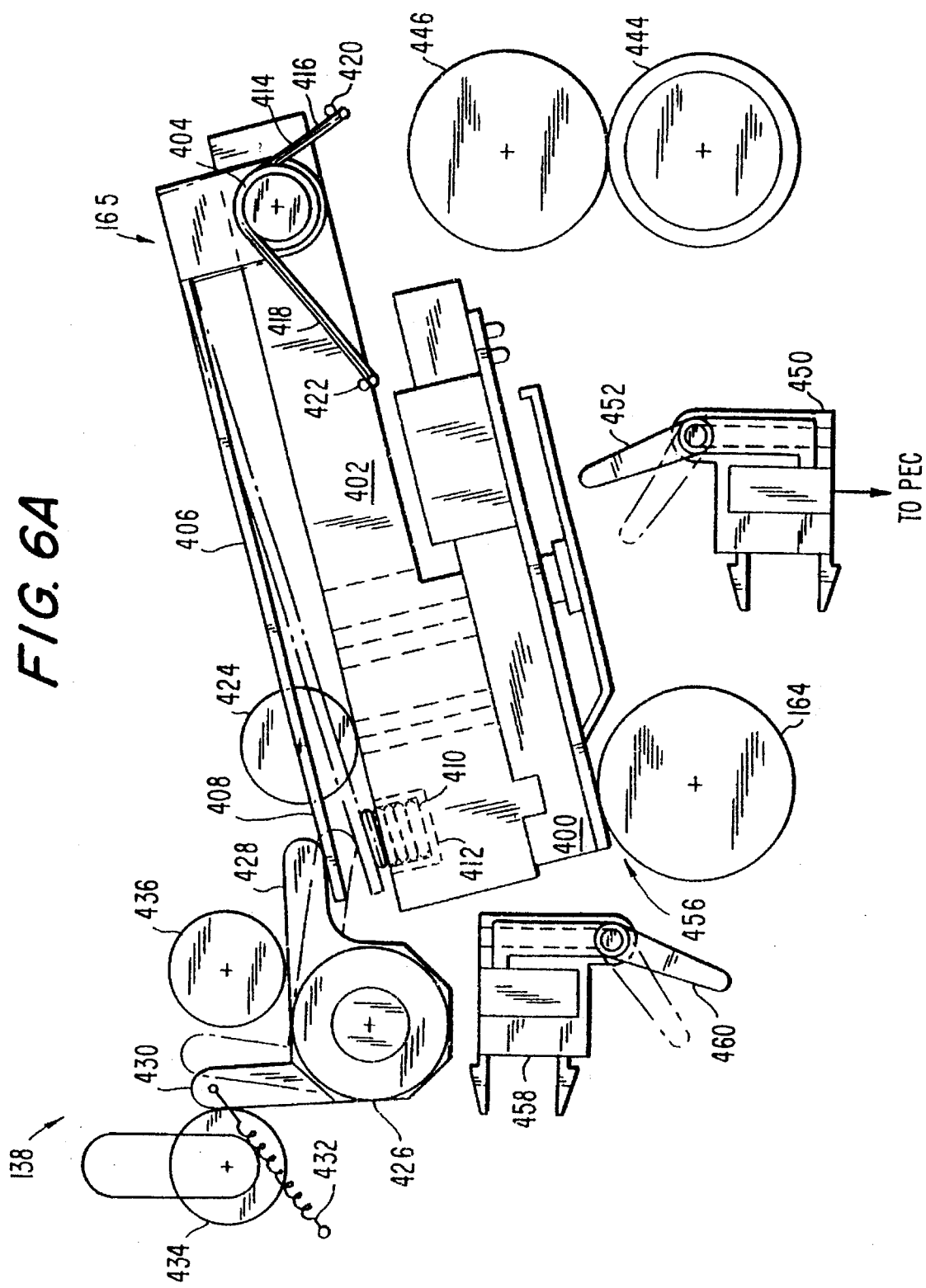

AIRLINE TICKET PRINTER WITH TICKET PRESTAGING

This application is a division of application Ser. No. 07/934,361, filed Aug. 25, 1992, issued May 3, 1994 as U.S. Pat. No. 5,309,176.

This invention relates to printing apparatus and methods, and particularly to apparatus and methods for printing vehicular transportation passenger coupons such as airline tickets and the like.

Airline ticket printers are widely used to print tickets and boarding passes, and other transportation documents for airline passengers. One type of airline printer is disclosed in U.S. Pat. No. 4,851,864, issued Jul. 25, 1989; U.S. Pat. No. 4,857,945, issued Aug. 15, 1989; and U.S. Pat. No. 4,962,393, issued Oct. 9, 1990. A stand-alone credit-card operated ticket printer of somewhat different capabilities is shown in U.S. Pat. No. 4,928,133, issued May 22, 1990. Such airline ticket printers are highly advantageous. Nonetheless, improvements are needed.

More specifically, it is an object of the invention to improve the accuracy and reliability of the printing apparatus for recording on and reading of information from a magnetic area or stripe on the ticket.

It also is an object of the invention to provide a printer and method in which the time required for printing tickets is reduced, while the number of different ticket stocks upon which printing may be accomplished is increased.

Another object of the invention is to provide means for making the loading of ticket blanks into the printer easier and faster. Another object of the invention is to print tickets more rapidly.

A further object of the invention is to provide such a printer and method in which tickets can be revised quickly and easily, and with good security.

It also is an object to provide a printer structure which simplifies and reduces the cost of its manufacture and maintenance. Further, it is an object of the invention to provide a printer which makes maximum utilization of its electronic system.

In accordance with the present invention, the foregoing objects are met by the provision of an airline ticket printer that includes a magnetic reading/writing station that has a read/write head for recording information on or reproducing information from a magnetic stripe carried on a ticket, structure for guiding tickets past the read/write head in such a way that the magnetic stripe of the ticket is presented to the read/write head, and a drive mechanism that drives the ticket past the read/write head with the drive mechanism bearing against the ticket at a substantial distance from the read/write head so that the magnetic stripe is free to flex independently of the portion of the ticket that is in contact with the drive mechanism. In this way more consistent contact of the read/write head with the magnetic stripe may be achieved so as to minimize errors ("drop-outs", e.g.).

A further feature of the invention is the provision of two magnetic reading/writing stations in series along a ticket feed path so that errors in reading or writing by the first station may be detected and/or corrected at the second station. The two magnetic stations allow magnetic reading and writing to be performed faster and more accurately.

In accordance with another feature of the invention, assembly of the printer is made easier by providing a sheet feeding system in the form of one or more modules that can be conveniently and precisely mounted on pins extending from a vertical mounting plate. According to a preferred embodiment of the invention, an airline ticket printer includes a print engine, a vertical, centrally located mounting plate, a plurality of mounting pins secured to and extending perpendicular to the mounting plate, and one or more sheet feeding modules having holes shaped and sized to receive the pins, the modules being mounted on the mounting plate with the pins extending into the holes of the modules, and fasteners holding the modules onto the pins.

A further feature of the invention reduces print cycle time by pre-staging ticket blanks from a ticket storage bin to a staging point. According to a preferred embodiment of the invention, an airline ticket printer includes a print engine, a storage bin for storing ticket blanks, a feed path for feeding the ticket blanks to the print engine from the bin along a guide path, and a mechanism for moving a ticket blank along the guide path to a staging point at which the ticket blank is held until a printing operation is to be performed.

According to another feature of the invention, there are also provided a second storage bin for storing ticket blanks and a mechanism for moving blanks from the second storage bin to a separate staging point at which the blank from the second bin also may be held until a printing operation is to be performed on the blank from the second bin. In this way, print cycle times for ticket printing may be reduced while permitting selection of either of two kinds of ticket blanks.

Yet another feature of the invention makes it easier to load ticket blanks into the printer by providing a ticket blank storage cassette for an airline ticket printer. The cassette preferably includes a horizontal, rectangular bottom wall having two side edges and two end edges, a pair of opposed vertical side walls extending along and rising from respective side edges of the bottom wall and set apart from each other at a distance so that a stack of ticket blanks may be held therebetween, a first of the side walls being substantially higher than the other, a pair of opposed vertical end walls rising from respective end edges of said bottom wall and extending between the side walls, and a handle that is integrally formed with a top edge of the first side wall and has an inverted U-shaped cross-section.

According to a further feature of a preferred embodiment, the weight of the ticket storage cassette is reduced, and tickets are reliably fed from the cassette, by providing a feed mechanism that is mounted to the ticket printer. In a preferred embodiment of the invention, there is provided in a ticket printing device, an apparatus for removing tickets from a cassette which holds a stack of vertically oriented tickets, the apparatus including a structure for receiving and holding the cassette, a mechanism for upwardly feeding from the cassette a first ticket of the stack, and a bias mechanism for biasing the stack in a lateral direction so that the first ticket is engaged by the feed mechanism.

Still another feature of the invention makes it more convenient to print a new ticket when an old ticket is returned, by providing a mechanism for inserting the old ticket into the printer, reading information that was magnetically encoded on the old ticket, and using the information to print a new ticket. According to a preferred embodiment of the invention, an airline ticket printer includes a mechanism for transporting a ticket blank with a magnetic stripe through a first magnetic stripe read/write station and then to a print engine, a housing, a mechanism within the housing for recirculating a previously printed ticket through a second magnetic stripe read/write station, the recirculation mechanism including an inlet opening in the housing, a guide structure for guiding the ticket inserted through the opening towards the second read/write station, a drive mechanism for moving the ticket through the second read/write station to read the information from the ticket, circuitry for receiving information read from the ticket and for receiving new information and for controlling the print engine to print a new ticket using the read information and the new information, and a receptacle in the housing for securely holding the recirculated ticket.

Also in accordance with the invention there is provided a control system for an airline ticket printer which includes a mother board having a plurality of board slots, a dual microprocessor system for controlling the printer, and formatting data to be printed, mounted on a board plugged into one of the slots, and at least one personal computer mounted on another board plugged into one of the slots, the personal computer being connected to send data to the dual microprocessor system and also being adapted to perform general computing tasks.

In this way, the electric components of the printer can be used for a variety of tasks in addition to ticket printing. In a preferred embodiment, two or more personal computers are mounted in respective slots, so that the printer can be shared by more than one input/output terminal.

Another feature helps to extend the life of a thermal print head used in the printer. According to this feature, there is provided an apparatus for printing information on a ticket that has a thickness T. The apparatus includes a frame, a platen mounted for rotation on the frame and a print head for printing information on the ticket. There is also a means for mounting the print head on the frame adjacent to the platen to form a gap between the platen and the print head. At least one of the platen and the mounting means is displaceable with respect to the other.

The apparatus further includes a feed mechanism for feeding the ticket toward the gap along a feed path. A sensor is disposed in the feed path for sensing the feeding of the ticket and for providing a feed time signal upon sensing the feeding of the ticket. The apparatus also includes control circuitry for receiving the feed time signal and for generating engage signals at a timed interval after receiving the feed time signal. Also included is an engage mechanism that includes a stepper motor responsive to the engage signals, for moving at least one of the platen and the print head in steps between a first relative position in which the gap is wider than the thickness T of the ticket and a second relative position in which the ticket is engaged between the platen and the print head. The print head is disengaged from said platen except when the ticket is present between them.

According to this feature there is also provided a method of operating an apparatus for printing information on a ticket, where the apparatus includes a platen and a print head and the ticket has a thickness T. The method includes the steps of maintaining a gap between the platen and the print head when the ticket is not present between them, the gap being wider than the thickness T of the ticket; feeding the ticket toward the gap; sensing the feeding of the ticket; and at a timed interval after sensing the feeding of the ticket moving at least one of the platen and the print head toward the other in steps until the ticket is engaged between the platen and the print head.

This feature allows the engaging force between the platen and the print head to be controlled more reliably than prior art systems in which a solenoid was used to engage the ticket between the print head and the platen, thereby extending the life of the print head while maintaining a desired print quality.

It is not intended that the invention be summarized here in its entirety. Rather, further features, aspects and advantages of the invention will be set forth in or apparent from the following description and drawings. In the drawings:

FIGS. 6A–6C are schematic right side elevation views of a print engine that is part of the printer of FIG. 5;

GENERAL DESCRIPTION

Figure 1:
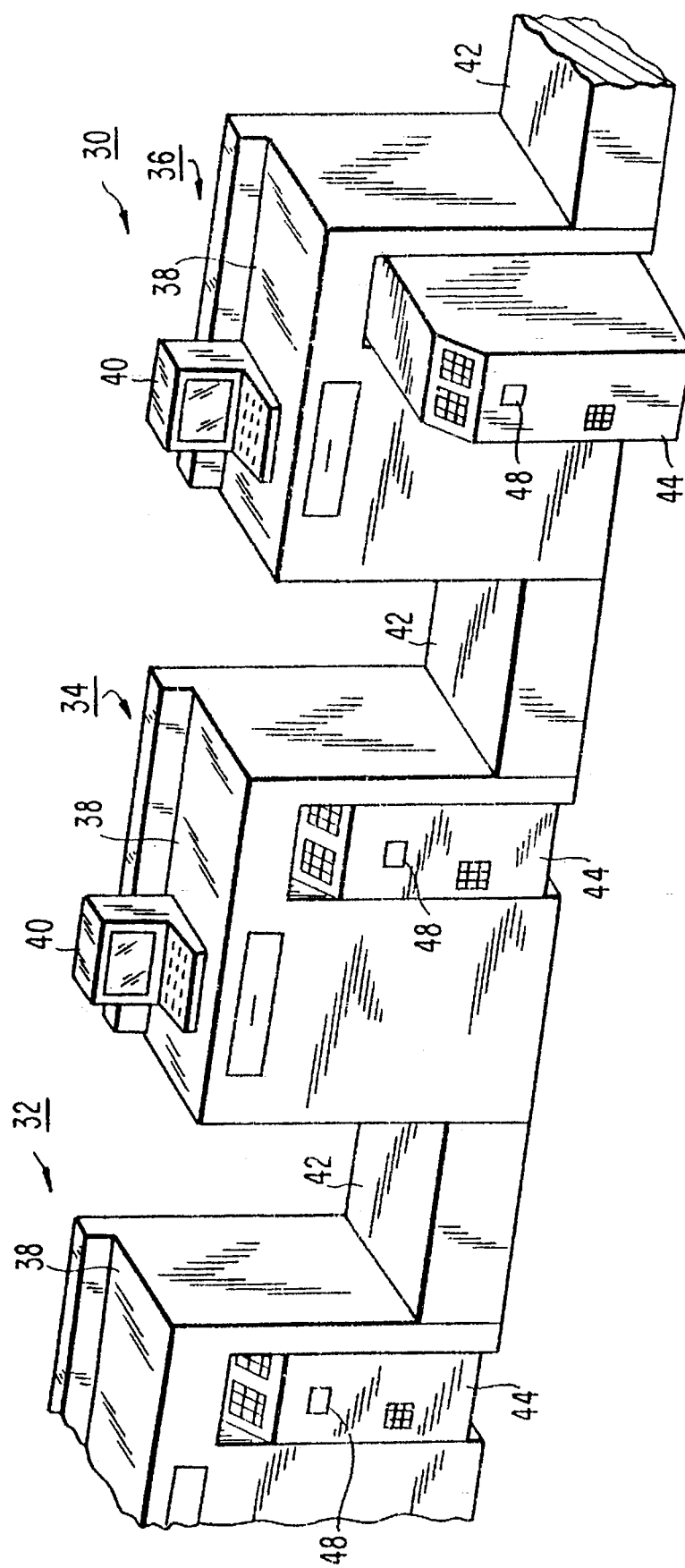
FIG. 1 is a perspective view of a portion of an airline ticket counter at an air terminal, showing several individual stations, each of which has one of the printers of the invention.

FIG. 1 shows a typical airline ticket selling counter 30 with individual ticket selling stations shown at 32, 34, and 36. At each station there is a counter top 38, an input/output device 40, a relatively low baggage-receiving and weighing surface 42, and a coupon printer 44. Printed tickets or other coupons are issued through an outlet opening 48 in the front of the printer. Each input/output device has a video screen and a keyboard enabling the operator to input passenger and other information and retrieve information regarding seat availability, etc.

Figure 4:
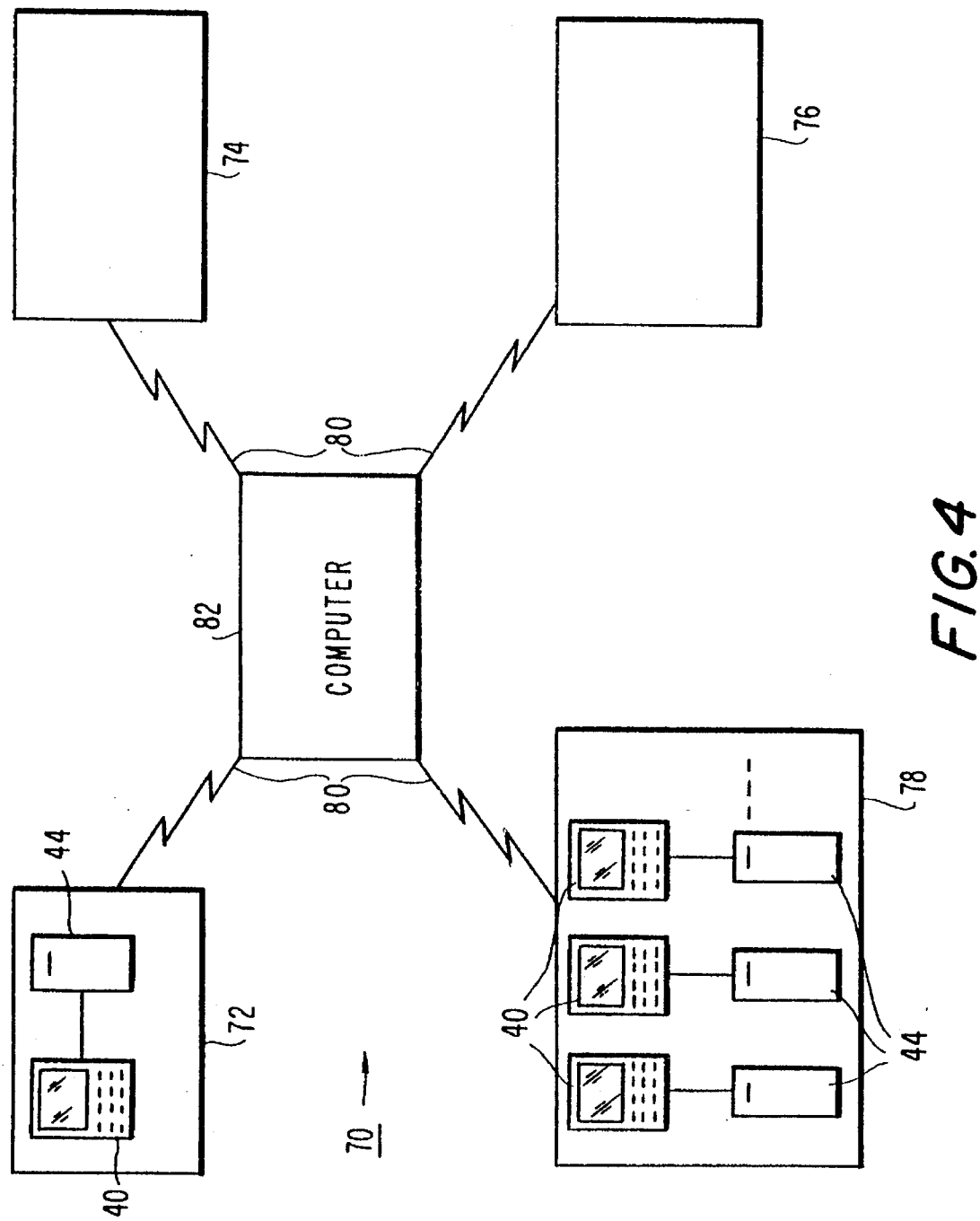
FIG. 4 is a schematic block diagram showing the computer network to which the individual sales terminals and printers are connected in the sale of airline tickets and other coupons.

As it is shown in FIG. 4, each input/output device 40 is connected by modems and other equipment (not shown)

through remote links 80 to a central computer system 82 in a regional or nationwide network involving a plurality of different input/output stations at locations 72, 74, 76, 78 etc.

If desired, each location can contain as few as one input/output device 40 and one printer 44, as in the case of the location 72, which might be a travel agent's office, for example, or it can contain a large number of such combinations as in an airline terminal 78. The computer system 82, an example of which is called "Apollo", computes, stores and sends reservation data and other data necessary to enable the ticket sales personnel to sell tickets, and to enable the printers to print coupons.

Referring again to FIG. 1, the printers 44 are fitted into relatively narrow and restricted cabinet spaces in the counters. The printers are constructed to roll outwardly from the cabinets so as to give the operator ready access to the printer mechanism. The printer 44 shown in the lower right hand portion of FIG. 1 has been withdrawn from its cabinet in the manner described. Preferably, a key must be inserted into a lock (not shown in FIG. 1) on the front of the unit to release it from the cabinet so it that can be pulled out. This lock preferably disables high voltage circuitry within the printer mechanism so as to allow operators to handle it without being shocked.

Figures 2, 3:
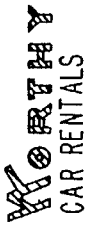
FIG. 2 shows an airline flight coupon printed by use of the printer and method of the present invention.
FIG. 3 shows a reservation/confirmation coupon printed by use of the printer and method of the present invention.

FIGS. 2 and 3 show two different types of coupons which can be printed by the printer mechanism 44 for use in airline transportation transactions.

FIG. 2 shows a passenger ticket and baggage check form 50. The form 50 has a stub end portion 52 which is intended for use in stapling the forms together and thus is excluded from the area to be printed on. The portion 52 is separable from the body of the form by perforations at 54. The form also has a boarding pass portion 56 at the opposite end. The boarding pass 56 is easily separable from the remainder of the coupon by means of a perforation 58.

The form 50 includes spaces for printing all relevant passenger ticketing information, including the amount of the fare and the total cost. It also includes a space for printing baggage information so that the coupon can be used by the passenger to reclaim his or her baggage.

Each of the forms 50 includes a pre-printed serial number indicated at 64. The forms are numbered serially so that strict accounting can be had for all forms issued. Each ticket agent or travel agent is held strictly accountable for every form issued to him or her. For example, during the shift of a ticket agent at one of the ticket counters shown in FIG. 1, the agent will be issued a group of serially-numbered forms, and the agent must account for all of those forms at the end of his or her shift. Thus, there is a significant need for the printer to avoid losing or damaging forms in the printing process. Furthermore, if two forms are fed simultaneously or a jam occurs, the operator should correct the situation immediately, in order to avoid the loss of a form. The printer should not require the operator to destroy forms in the process.

Still referring to FIG. 2, on the rear surface of the form 50 is a magnetic stripe 62 shown in dashed lines extending the entire length of the form near its upper edge as shown in FIG. 2. Data regarding the passenger and the transaction are recorded on the magnetic stripe 62 and can be read by magnetic reading means to input the data quickly into the central computer for use in its operations, or for a variety of other purposes.

The coupon 66 shown in FIG. 3 is a reservation confirmation coupon or form for automobile rentals made by the passenger through a travel agent or airline ticket agent. The form 66 is not perforated.

Reservation confirmation form 66 also can be used for confirming hotel reservations or any similar matter to be handled by the ticket agent or travel agent. Both types of travel coupons 50 and 66 shown in FIGS. 2 and 3 can be stored in and printed by the printer 44 upon demand. Other forms having the same size and shape as coupons 50 and 66, such as airplane boarding pass blanks, can also be used with printer 44.

Figure 5:
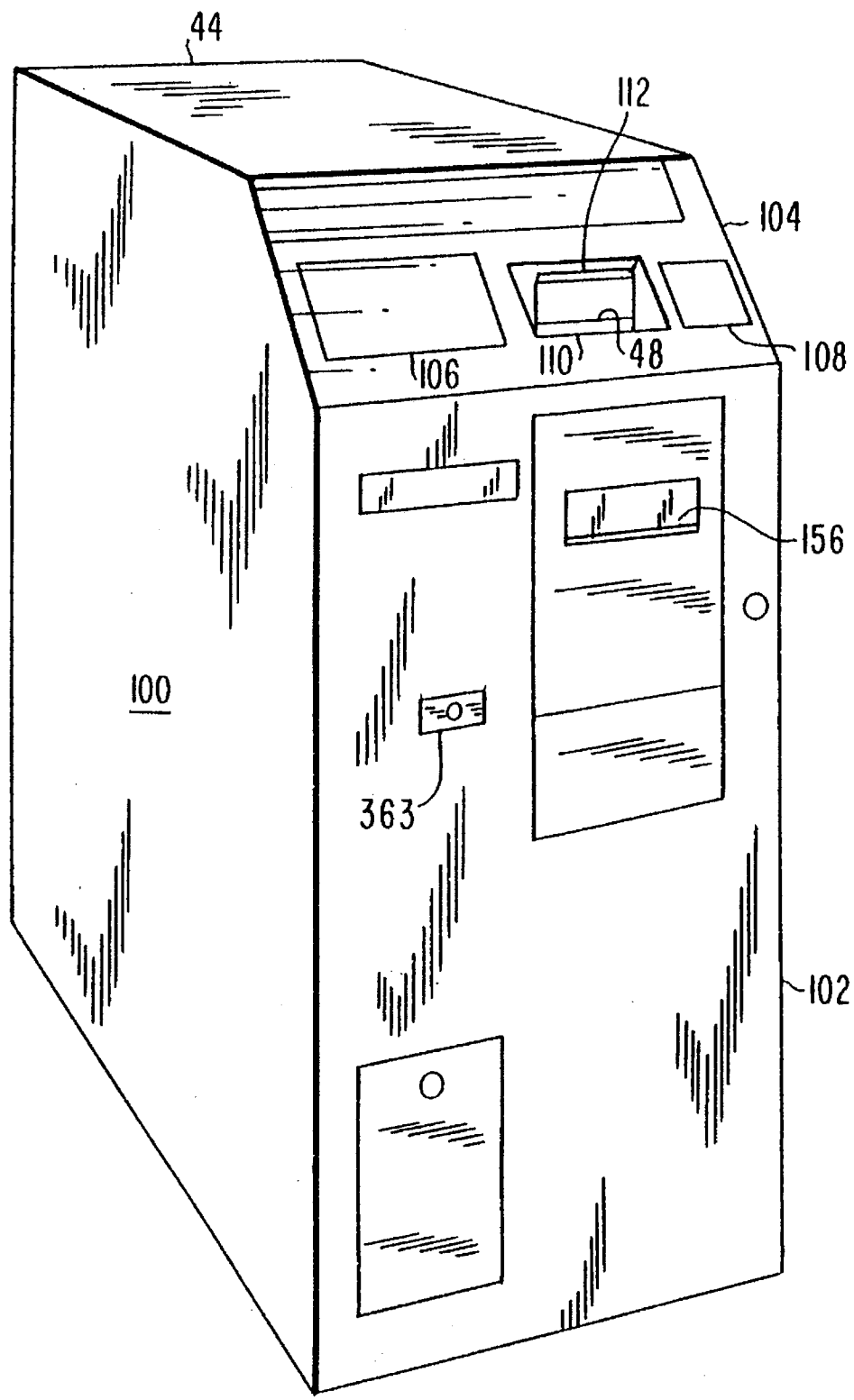
FIG. 5 is a perspective view of the printer of the present invention.

Referring now to FIG. 5, printer 44 includes a cabinet 100 with a front panel 102, which includes an inclined upper portion 104. Upper portion 104 has a display section 106 and a key pad 108. Display section 106 may include, for example, an LED display and/or LCD display.

Upper portion 104 also has a recess 110 in which are located outlet opening 48 and inlet opening 112. Cabinet 100 is mounted on casters 114 (FIGS. 6 and 9) which allow printer 44 to be rolled in and out of ticket counter 30, as discussed above.

TICKET FEED PATHS

Figure 6:
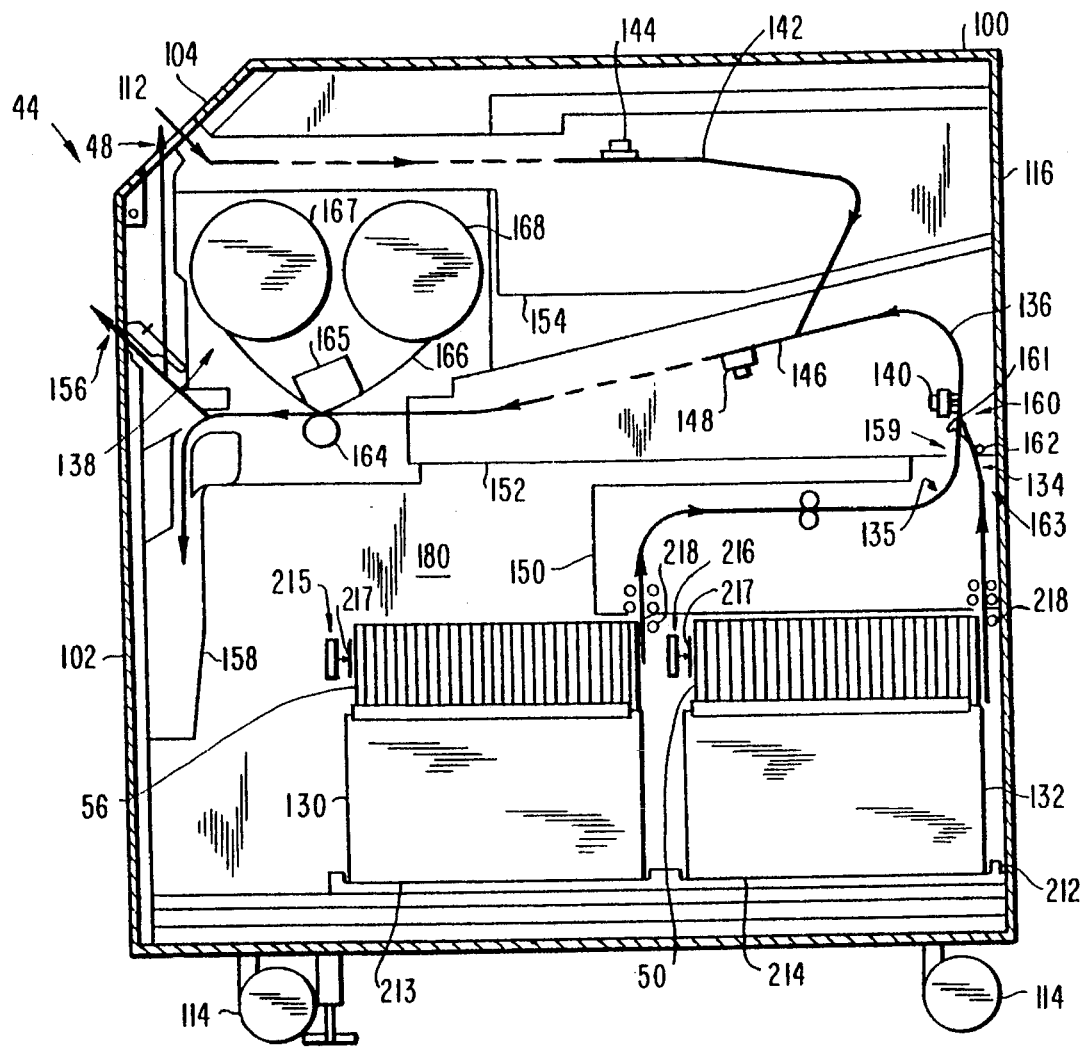
FIG. 6 is a schematic right side elevation view of the printer of FIG. 5 with its cover removed.

Referring now to FIG. 6, there will now be described in general terms feed paths for tickets within printer 44. Held within cabinet 100 are removable ticket blank supply cassettes 130 and 132. As shown in FIG. 6, cassette 132 holds a plurality of ticket forms 50 and cassette 130 holds a plurality of reservation forms 66. It will be appreciated that it is possible to store identical ticket blanks in both cassettes 130, 132 if only one type of blank is required. Blanks 50 and 66 are held in a substantially vertical orientation within cassettes 132 and 130.

As schematically shown in FIG. 6, blanks may be withdrawn from either cassette 130 or cassette 132 and advanced to respective staging points 134 and 135, at which the blanks are held until a printing operation is initiated, as will be discussed in more detail below. A ticket blank from cassette 130 and a ticket blank from 132 may be simultaneously held at staging points 135 and 134 respectively.

From the staging points a feed path 136 is defined which leads to print engine 138. Located along feed path 136 is a magnetic read/write station 140 at which data may be recorded on, or reproduced from, a magnetic stripe 62 of a ticket blank.

A feed path 142 leads from inlet opening 112. A magnetic read/write station 144 is located along feed path 142.

It will be observed that feed path 144 initially proceeds rearwardly from inlet opening 112 and then downwardly and forwardly while first feed path 136 extends upwardly from staging point 134 and than forwardly and downwardly. The two feed paths 136 and 142 converge to form a common feed path section 146 which leads on to print engine 138. Located along feed path section 146 is a magnetic read/write station 148.

The feed paths are constructed with feed modules 150, 152 and 154, which will be described in more detail below.

After passing through print engine 138, tickets may be either fed out to outlet opening 48 or through stacker door 156 or diverted to secure holding bin 158.

CHECK VALVE

As will be discussed below with respect to FIGS. 18A–18D, if an error occurs in magnetic recording or reading of information on a ticket 50, the ticket may be reversed along feed path section 146 so that it may be advanced a second time past magnetic read/write station 148. Moreover, in a high speed mode of operating printer 44, tickets may be fed in rather close proximity to each other so as to achieve a time between tickets of approximately 0.463 seconds. In such a high speed mode, a first ticket may be advanced past magnetic read/write station 148 at the same time that a second ticket is advanced past magnetic read/write station 140. In that case, if there is an error in reading or recording information on the first ticket, it may be desired to run the feeding mechanism of feed module 152 in reverse so that reading of or recording on the first ticket may be reattempted. In order to prevent the second ticket (i.e. the one near station 140) from being fed back into staging points 134 and 135 and causing jams therein, feed module 152 is provided with a check valve 160 at its inlet 159. Check valve 160 includes a gravity gate member 161 that is mounted on a pivot 162. Gate member 161 freely rotates upward (i.e. clockwise, as seen in FIG. 6) from its position shown in FIG. 6 so that blanks fed from staging points 134 and 135 may freely advance into inlet 159 of feed module 152. However, gate member 161 is prevented from rotating downward (i.e. counter-clockwise) beyond the position shown in FIG. 6, so that when a second ticket is reversed past station 140, the second ticket is diverted by gate member 161 into a temporary holding area 163. When the first ticket is advanced again past station 148, the second ticket will be simultaneously advanced from holding area 163 past station 140.

PRINT ENGINE

Print engine 138 includes a platen 164 and a thermal transfer unit 165 which cooperates with platen 164 to transfer characters and other printed images from a thermal printing ribbon 166 onto tickets 50 that are fed in between platen 164 and transfer unit 165. Ribbon 166 is unwound from supply reel 168 and is taken up by take-up reel 167.

Figure 6B:
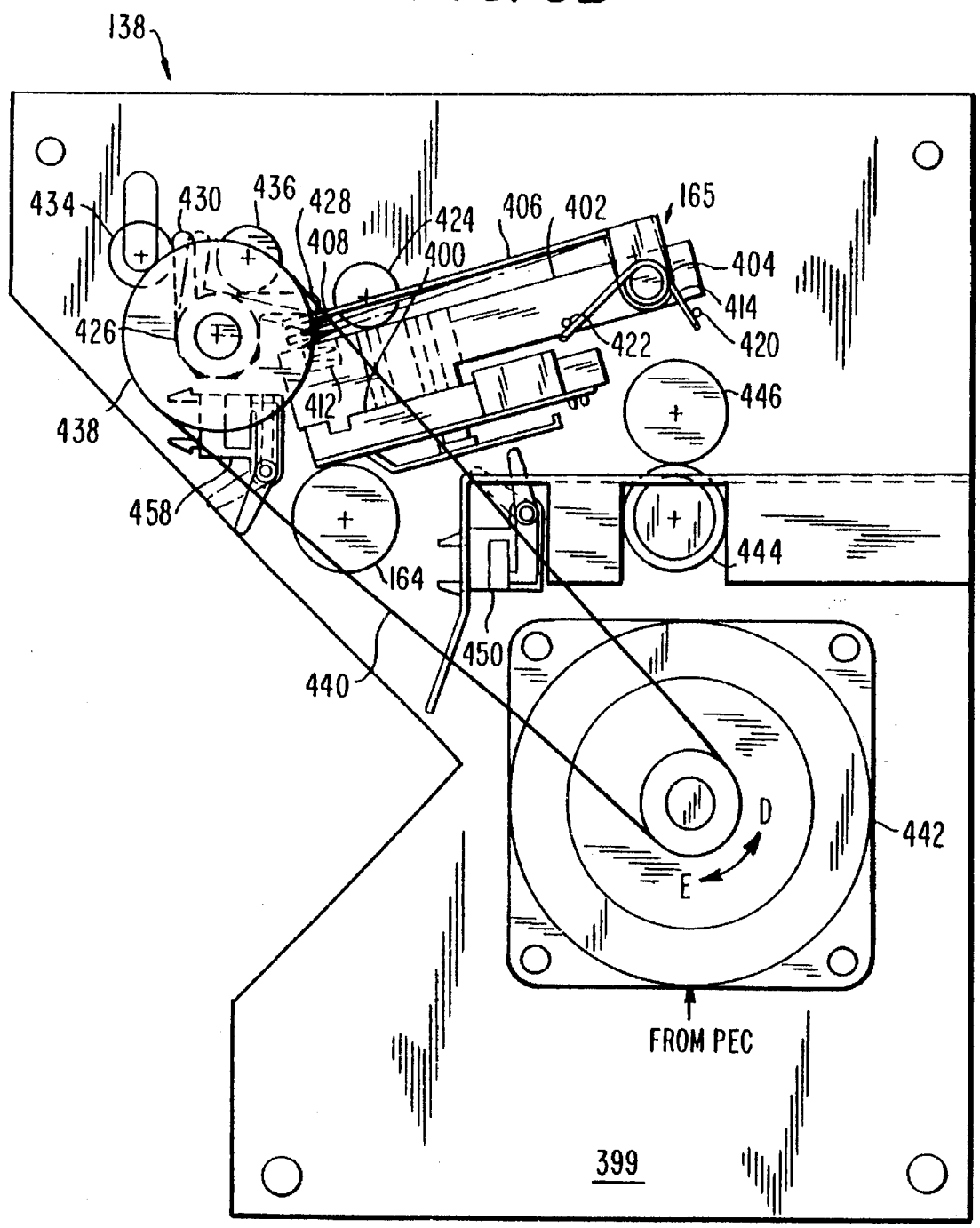
Figure 6C:
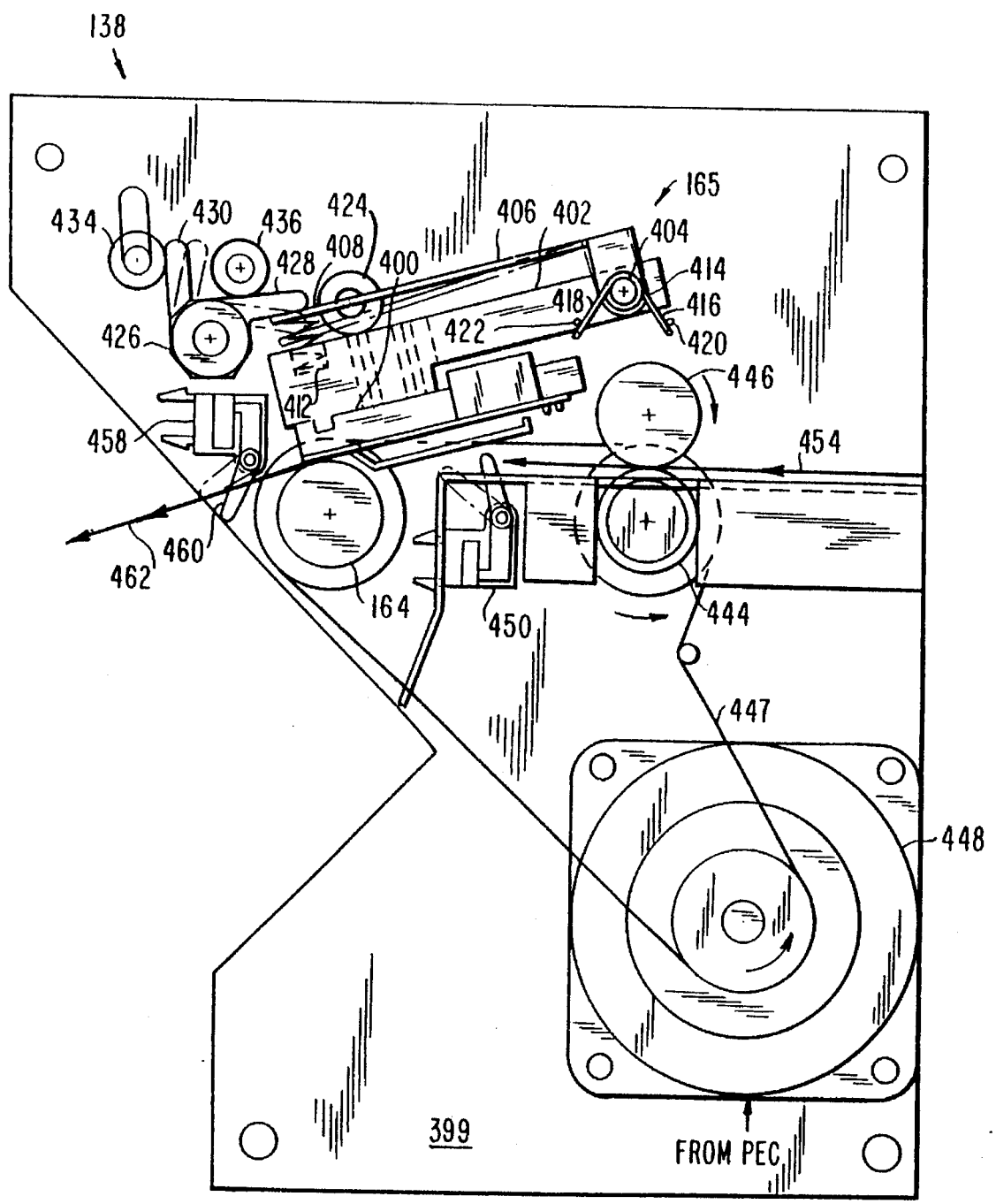

Details of print engine 138 are shown in FIGS. 6A–6C.

Thermal transfer unit 165 includes a print head 400 which is mounted on head carrier bar 402. Carrier bar 402 is mounted on pivot 404 for pivotal motion in a generally upward or downward direction. Also mounted on pivot 404 is spring keeper 406 which extends longitudinally above and generally parallel to the top surface of carrier bar 402. Spring keeper 406 is pivotable for movement in a generally upward or downward direction. Pivot 404 is mounted to a fixed structure of printer 44, such as frame 399 (FIGS. 6B, 6C).

A distal end 408 of spring keeper 406 rests upon a compression spring 410 (FIG. 6A) and serves to retain compression spring 410 in a recess 412 that is formed in the upper surface of head carrier bar 402.

Also mounted on pivot 404 is torsion spring 414. Spring 414 has legs 416 and 418. Leg 416 contacts a pin 420 that is mounted on the frame 399 of printer 44, while leg 418 contacts pin 422 that is mounted on carrier bar 402. Spring 414 is arranged to bias carrier bar 402 in an upward (i.e. clockwise) direction.

A head return stop pin 424 is mounted on the frame 399 of printer 44 above head carrier bar 402 and provides back-up or overrun protection to limit the upward motion of carrier 402.

A rocker arm 426 is pivotally mounted on the frame 399. Rocker arm 426 has tangs 428 and 430 which extend tangentially from rocker arm 426 at substantially a right angle from each other. Tang 428 extends in a generally horizontal direction and contacts the upper surface of end 408 of spring keeper 406.

Tang 430 extends in a generally upward direction. A spring 432 connected between the frame 399 of printer 44 and tang 430 biases rocker arm 426 in a counterclockwise direction (FIG. 6A). Stop pins 434 and 436 are respectively mounted to the left and right of tang 430. Pin 434 limits the movement of tang 430 and rocker arm 426 in the counterclockwise direction and pin 436 limits the movement of tang 430 and rocker arm 426 in the clockwise direction.

Referring to FIG. 6B, rocker arm 426 has a pulley 438 mounted thereto. Pulley 438 is connected via belt 440 to a head engagement stepper motor 442.

Located to the right of platen 164 is drive roller 444. Idler roller 446 is paired with drive roller 444.

Referring to FIG. 6C, a common drive belt 447 allows both platen 164 and drive roller 44 to be driven in a counterclockwise direction by a card drive stepper motor 448.

As best seen in FIGS. 6A and 6C, a sensor 450 is disposed between platen 164 and roller 444. Sensor 450 has a pivotally displaceable flag 452 that extends upwardly into a card feed path (indicated by arrows 454) between the nip of rollers 444 and 446 and toward a gap 456 that is formed between platen 164 and print head 400. A sensor 458 is located to the left of platen 164. Sensor 458 has a pivotally displaceable flag 460 which extends generally downward into card exit path 462.

In a preferred embodiment of printer 44, sensor 450 and 458 are of a type in which displacement of their respective flags to the positions shown in phantom on FIG. 6A, breaks an optical connection that is maintained when the respective fags are in their normal positions, as shown by solid lines, particularly in FIG. 6A.

There will now be described operation of print head 400 for engagement and disengagement. Rocker arm 426 is normally held in its home position (shown in solid lines) by the biasing force of spring 432, and with tang 430 in contact with stop pin 434.

When rocker arm 426 is in its home position, the biasing force of spring 414 holds carrier bar 402 in such a position (the "disengaged" position) that head 400 is spaced apart from platen 164 by a gap distance of approximately 0.010 to 0.015 in. As is well known to those skilled in the art, a typical card to be printed has a thickness T of about 0.007 in, so that the gap 456 between platen 164 and head 400 is wider than the thickness T of the ticket when head 400 is in the disengaged position. The upward movement of head carrier bar 402 is limited by tang 428 of rocker 426, which acts on carrier bar 402 through spring keeper 406 and compression spring 410. In a preferred embodiment of printer 44, pin 424 is also present as overrun protection to stop upward movement of head carrier bar 402.

When a ticket blank is driven by rollers 444 and 446 toward platen 164, the leading edge of the ticket displaces flag 452, tripping sensor 450. Sensor 450 is connected (connections not shown) to print engine control (PEC) electronics, which are described below, and provides a feed time signal to PEC electronics. After a predetermined period after receipt of the feed time signal and under software control, head engagement motor 442 is driven, as described just below, to move head 400 downwardly so that the ticket is engaged between head 400 and platen 164. Preferably engagement occurs when the leading edge of the ticket has progressed through the head/platen gap 456 to the extent of 0.05 in.

Engagement of a ticket between head 400 and platen 164 will now be described. At a timed interval after receipt of the feed time signal, the PEC supplies engage driving signals (i.e. pulse signals) to stepper motor 442 (for simplicity, the connection between motor 442 and the PEC is not shown). Under control of pulses received from the PEC, stepper motor 442 rotates in steps in a clockwise direction E (FIG. 6B) causing rocker arm 426 to be rotated clockwise. Tang 428 of rocker arm 426 is rotated a few degrees downwardly, thereby pressing on spring keeper 406 (FIG. 6A), which in turn compresses spring 410. Spring 410 then moves head carrier bar 402 downwardly in steps against the biasing force of spring 414, so that the ticket is engaged between head 400 and platen 164. It will therefore be appreciated that spring 410 transmits a downward force from rocker arm 426 to carrier bar 402.

In a preferred embodiment, rocker arm 426 is driven by motor 442 so that in its engaged position (shown in phantom), tang 430 is a short distance to the left of stop pin 436. Stop pin 436 thus functions as an overrun protection pin so that an excessive force is not applied to head 400. The printer control electronics are programmable to reduce the distance between the engaged position of tang 430 and pin 436 if it is desired to adjust print quality by arranging tighter engagement of the ticket between head 400 and platen 164. Stepper motor 442 is a high torque, low inertia motor so that in the event of a power outage, the force of spring 414 will be sufficient to rotate carrier bar 402 upwardly (and thereby rotate rocker 426 in a counterclockwise direction) so that head 400 is disengaged from platen 164.

Printing upon the ticket is carried out in accordance with the timing of the detection of the ticket by sensor 450. When printing is complete and the ticket has been advanced so far that the trailing edge of the ticket is approximately 0.05 in. from exiting gap 456, motor 442 is pulsed to rotate in the counterclockwise direction so that rocker arm 426 also rotates counterclockwise. The pressure of tang 428 on spring keeper 406 is thereby lessened, allowing carrier bar 402 to move upwardly (clockwise) under the force of spring 414, so that head 400 is disengaged from the ticket and platen 164, and rocker arm 426 and spring keeper 406 return to their home positions. It will be understood that the ticket continues onward along path 462 to exit the printer 44, with platen 164 acting as an exit roller. Sensor 460 is provided to detect whether the ticket has for some reason failed to properly exit printer 44, e.g. because of a jam.

It will be understood from the foregoing that head 400 is disengaged from platen 164 at all times except when a ticket is interposed therebetween. By preventing direct contact between head 400 and platen 164 the life of the print head is extended by minimizing abrasion and by assuring that the ticket is available for diffusion of heat produced by head 400.

In a preferred embodiment of printer 44, tickets are driven within feed module 152 at a rate of 21 inches per second, for rapid feeding of tickets from cassettes 130 and 132 to print engine 138. Feeding within print engine 138 (i.e. by rollers 444 and 446 and platen 164) is the rate of 4 inches per second. Accordingly, roller 444 is driven with a one way clutch, so that when a ticket is fed from module 152 to the nip of rollers 444 and 446, roller 444 is free to be accelerated by the ticket to allow the ticket to continue to advance at the rate of 21 inches per second. At a point where the leading edge of the ticket is approximately ¼ inch from flag 452 of sensor 450 the trailing edge of the ticket is ejected from the nip of the last feed roller of module 152 and is immediately decelerated by roller 444 and 446 so that the ticket is thenceforward driven at a rate of 4 inches per second through the action of rollers 444 and 446, platen 164 and ticket drive motor 448.

Although in the embodiment shown in FIGS. 6A–6C, platen 164 is rotatable about a fixed axis, with head 400 being mounted for movement between retracted and engaged positions, it will be appreciated that alternative embodiments are possible in which head 400 is fixedly mounted and platen 164 is retractable therefrom. It will also be appreciated that both platen 162 and head 400 may be mounted for retracting movement with respect to each other.

It will be appreciated that other types of printing mechanisms, such as a direct thermal print engine or an ion deposition engine, may be used instead of the thermal transfer print engine 138 shown in FIG. 6.

INTERNAL STRUCTURE

The overall internal structure of printer 44 will now be described with reference to FIGS. 7–9. Vertical mounting plate 180 runs longitudinally near the center of cabinet 100 and is mounted on base 182 which forms the floor of cabinet 100. Plate 180 is rigid and substantial and supports many of the mechanical and electrical components of printer 44. Plate 180 may support frame 399 (FIGS. 6B, 6C) or may integrally include frame 399.

Figure 7:
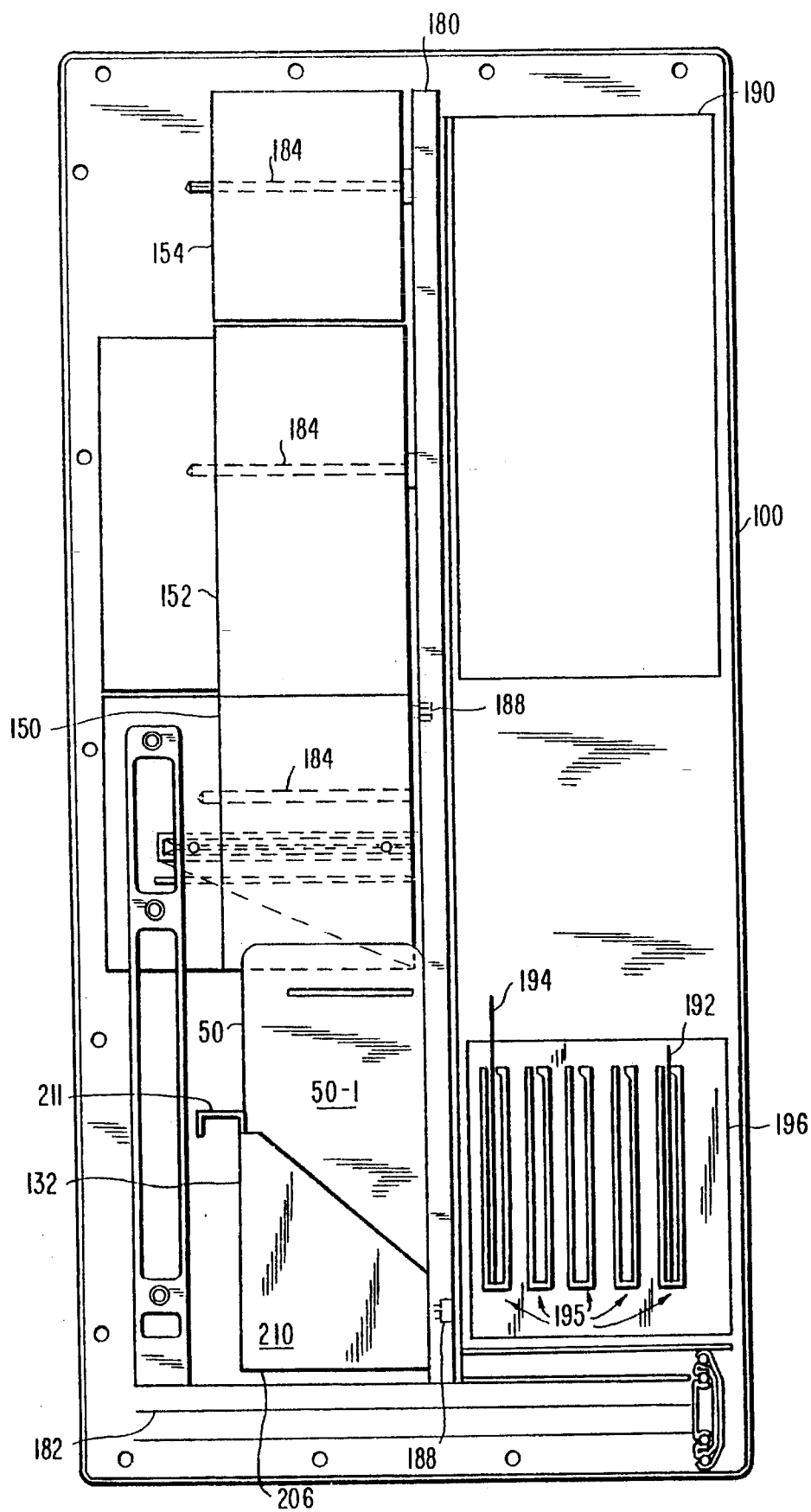
FIG. 7 is a rear elevation view of the printer of FIG. 5 with its cover removed.

A plurality of mounting pins 184 extend perpendicularly from mounting plate 80, as best seen in FIG. 7. Feed modules 150, 152 and 154 are secured to mounting plate 80 by pins 184. Ticket cassettes 130 and 132 are placed adjacent to plate 180 and below module 150. Passing through plate 180 are sockets 188 which permit interconnections between electronic components of the tape modules and the electronic control components of printer 44 which are located on the opposite side of plate 180.

Among the electrical and electronic components are power supply 190, PC/AT card 192 and printer electronics board 194. Both PC/AT card 192 and printer electronics board 194 are received within slots 195 of mother board 196. Empty slots 195 may be used to accommodate optional electronics modules such as additional PC/AT cards, communications and LAN cards, a fax card, a video card, memory expansion cards, and the like.

PC/AT card 192 controls floppy disk drive 198, to which it is connected through mother board 196.

Power supply 190 is located in the upper part of cabinet 100 to aid in dissipation of heat produced by power supply 190.

STRUCTURE OF TICKET CASSETTES

Figure 10:
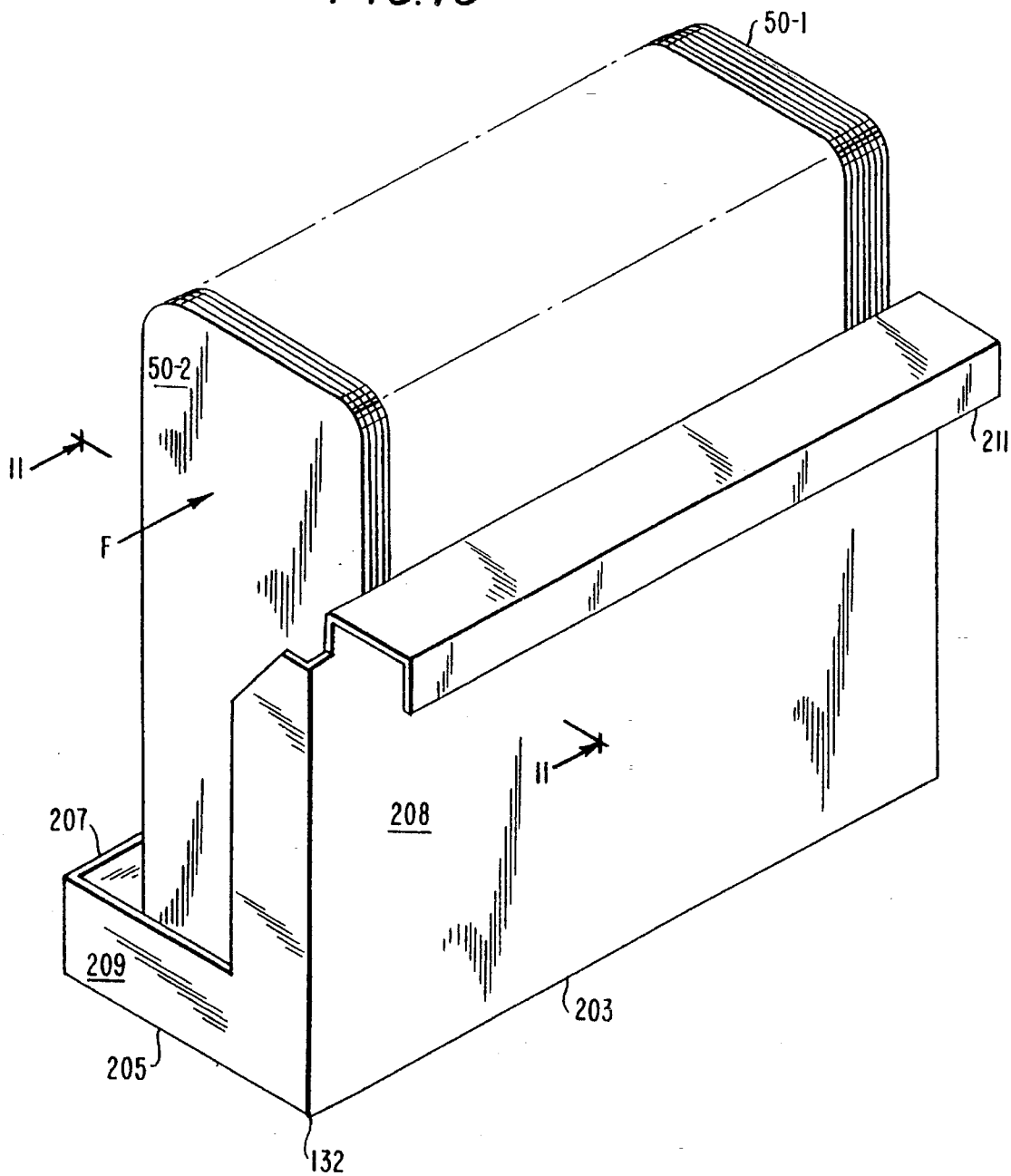
FIG. 10 is a perspective view of a ticket storage cassette used with the printer of FIG. 5.
Figure 11:
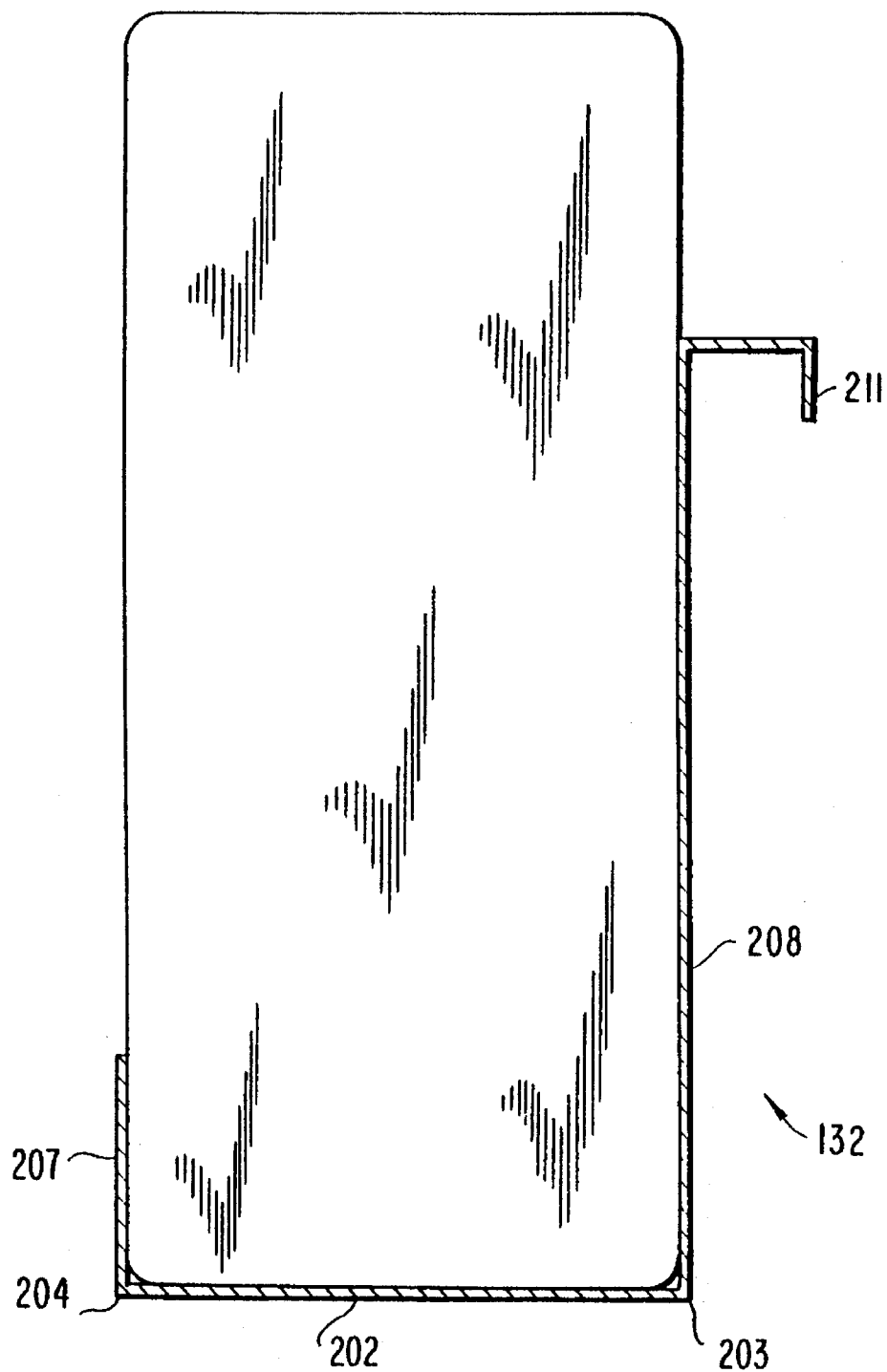
FIG. 11 is a cross-sectional view of the ticket cassette of FIG. 10 taken along the line 11—11.

The structure of ticket cassette 132 (which is identical to cassette 130) will now be described with reference to FIGS. 10 and 11.

Ticket cassette 132 is preferably constructed of a thin walled material, such as metal or plastic, and includes a horizontal, rectangular bottom wall 202 which has relatively long side edges 203 and 204 and relatively short end edges 205 (FIG. 10) and 206 (FIG. 7).

A relatively low rectangular side wall 207 extends along and rises from side edge 204 of bottom wall 202. Located opposite to wall 207 is a relatively high vertical side wall 208 which extends along and rises from side edge 203 of bottom wall 202. Vertical end wall 209 is substantially L-shaped add rises from end edge 205 of bottom wall 202. End wall 209 extends between side walls 207 and 208. As shown in FIG. 7, a second vertical end wall 210 rises from end edge 206 of bottom wall 202. End wall 210 also extends between side walls 207 and 208. End wall 210 is cut at an angle so that its height varies from that of side wall 208 to that of side wall 207. Referring again to FIGS. 10 and 11, a handle 211 is formed integrally with the upper edge of high side wall 208 and has a cross section that is an inverted U-shape.

A stack of ticket blanks 50, including a first ticket blank 50-1 and a last ticket blank 50-L, is held between opposed side walls 207 and 208 and is supported by bottom wall 202. As previously noted, the stack of ticket blanks is held in a vertical orientation. Ticket blank 50-1 is held adjacent to end wall 210.

In a preferred embodiment of cassette 132, bottom wall 202 is 3⅜ in. wide (i.e. end edges 205 and 206 are 3 ⅜ in. long) so as to rather closely accommodate a vertical stack of standard tickets blanks that are 3¼ by 8 in. In that embodiment, bottom wall 202 is 8 in. long, side wall 208 is 6½ in. high and side wall 207 is 1¼ in. high.

Referring again to FIG. 6, a tray 212 is fixed to the bottom of cabinet 100. Tray 212 includes two slots 213 and 214, each of which is sized to receive a respective one of cassettes 130 and 132. Slots 213 and 214 respectively receive and hold cassettes 130 and 132.

Bias means 215 and 216 are both mounted on plate 180. Mounted on each bias means is a push plate 217. A spring, such as a constant force spring, or another biasing mechanism biases push plate 217 so that it exerts a force (represented by Arrow F in FIG. 10) on the last ticket 50-L of the stack of tickets held in a respective ticket cassette 130 or 132. Push plate 217 is accommodated by the L-shape of end wall 209 so that it is in contract with ticket 50-L. Thus, each push plate 217 biases a respective stack of ticket blanks in a lateral direction. The first ticket 50-1 of each stack is brought into engagement with a feed means such as a feed roller 218. In cooperation with the force exerted by its respective push plate 217, each feed roller 218 upwardly feeds the first ticket so that it is removed from its ticket cassette and is fed into feed module 150.

FEED MODULE STRUCTURE

Figure 12:
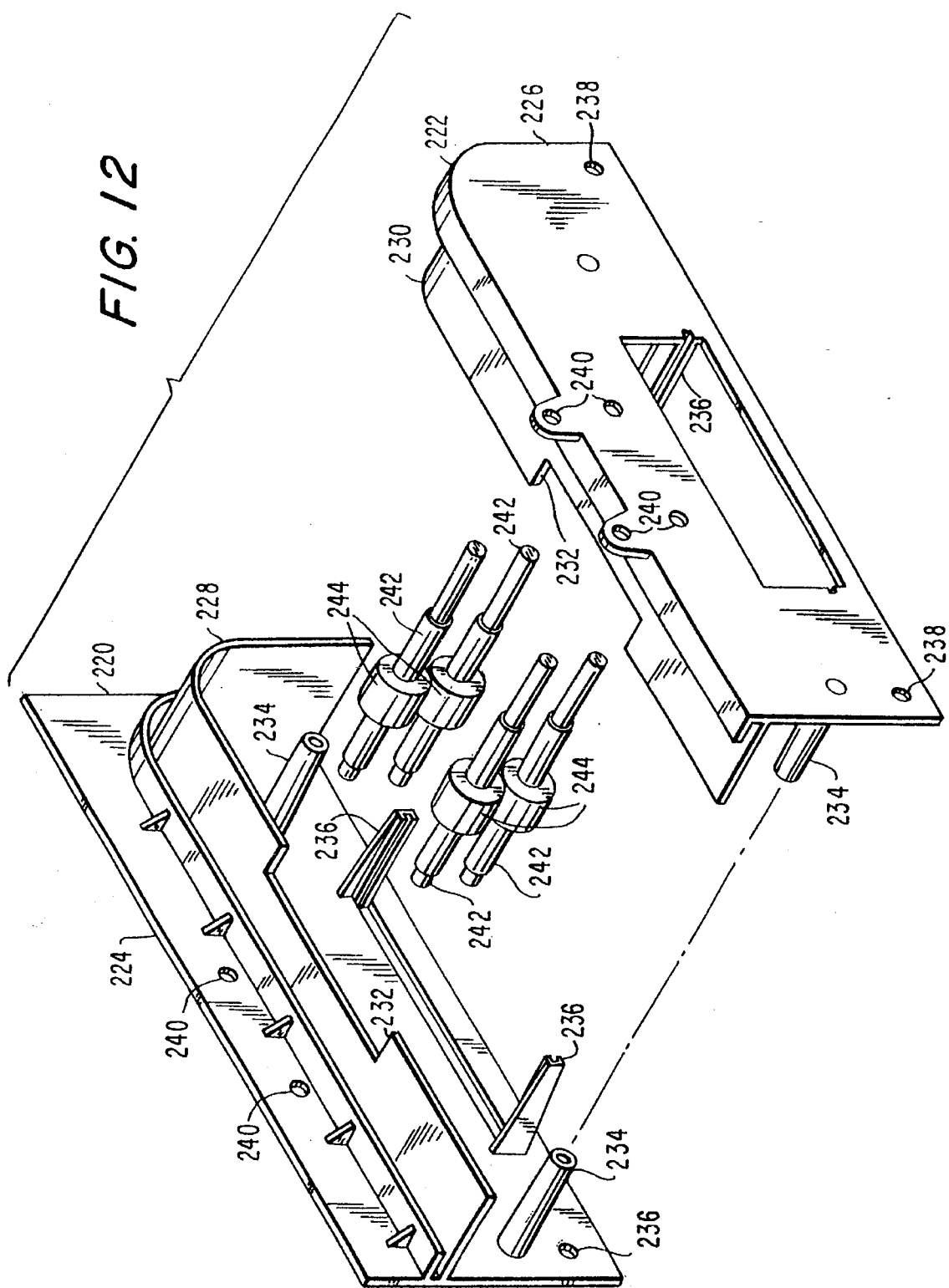
FIG. 12 is an exploded perspective view of a typical ticket feed module of the printer of FIG. 5.
Figure 13:
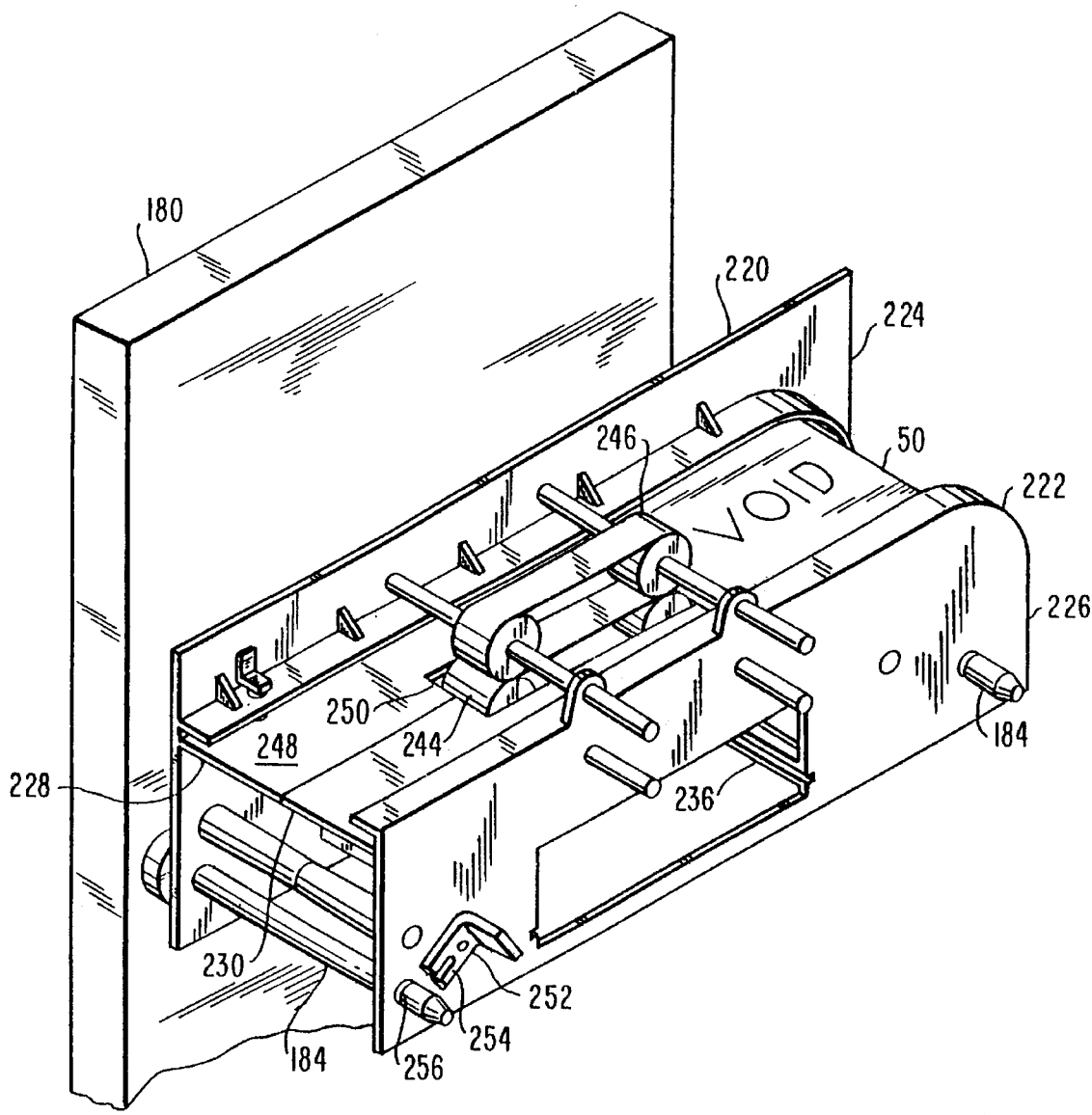
FIG. 13 is an assembled perspective view of the ticket feed module of FIG. 12.

As shown in FIGS. 12 and 13, a typical section of a feed module includes frame halves 220 and 222.

Frame halves 220 and 222 respectively include module walls 224 and 226. Extending respectively from walls 224 and 226 are guide halves 228 and 230. Formed in each guide half is an aperture break 232.

Frame halves 220 and 222 also include assembly bosses 234 and PWB slots 236. Frame halves 220 and 222 further include mounting holes 238 that are sized to receive a mounting pin 184. Frame halves 220 and 222 also have holes 240 for receiving stepped shafts 242 on which are mounted rollers 244.

The module is assembled by aligning corresponding assembly bosses of the frame halves 220 and 222 and bringing the bosses into abutment. Shafts 242 are held between the frame half 220 and 222 by holes 240. It will be seen that four rollers 244 form an upper and lower pair of rollers and that the upper pair carries an endless driving belt 246.

Guide halves 228 and 230 join to form document guide 248 and PWB slots 236 also join to form a slot for holding a printed wiring board. Further, aperture breaks 232 of the respective guide halves join to form a driving aperture 250, through which belt 246 engages lower rollers 244 in order to drive a ticket blank 50.

The module is mounted to mounting plate 180 with a mounting pin 184 passing through respective holes 238 of frame halves 220 and 222. Clip 252 includes a slot 254 which engages pin 184 and allows clip 252 to be inserted into a circumferential locating groove 256 of pin 184 to secure the module to plate 180.

Figure 14:
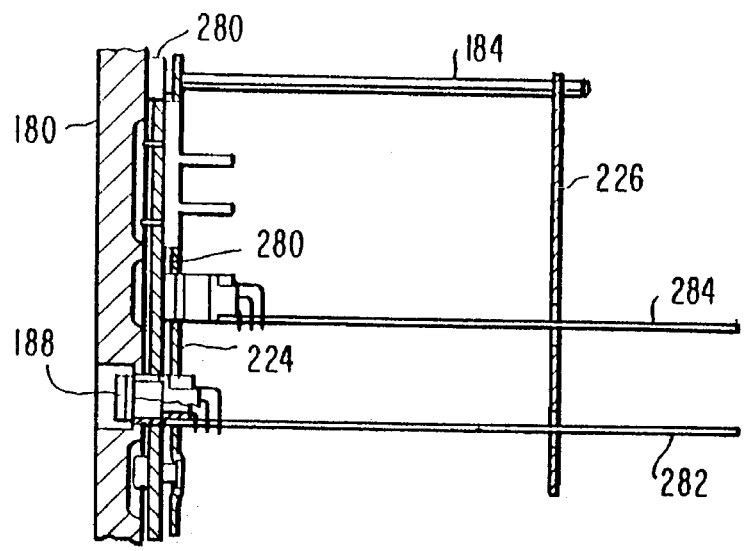
FIG. 14 is a cross-sectional view of a typical feed module of the printer of FIG. 5, showing electrical connections with printed wiring boards of the feed module.

FIG. 14 shows a typical interconnection of printed wiring boards for feed modules. A PWB backplane 280 is connected to a socket 188 in mounting plate 180.

Figure 8:
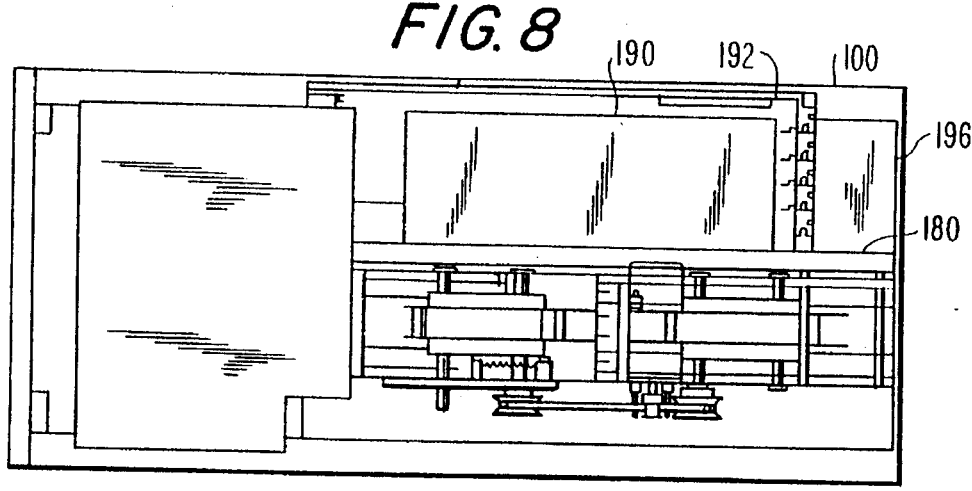
FIG. 8 is a plan view of the printer of FIG. 5 with its cover removed.
Figure 9:
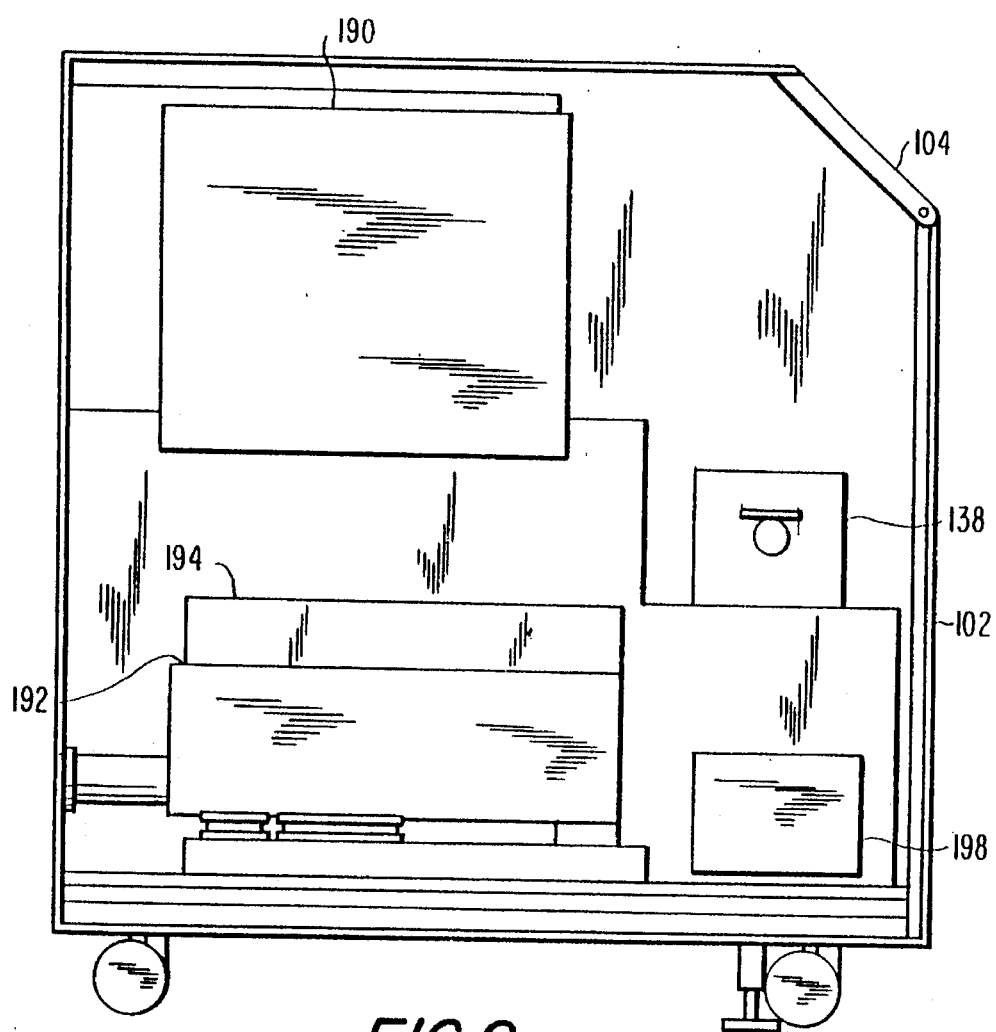
FIG. 9 is a left side elevation view of the printer of FIG. 5 with its cover removed.

Socket 188 is preferably a 48-pin or 96-pin socket of a known type and is connected via conventional flex circuits (not shown) to electric components of printer 44 located to the left of plate 180 (those electric components are not shown in FIG. 14; see FIGS. 7–9).

Referring again to FIG. 14, a host printed wiring board 282 and a slave printed wiring board 284 are both connected to backplane 280.

MAGNETIC READ/WRITE STATIONS

Details of the magnetic read/write stations will now be discussed with reference to FIGS. 15A, 15B and 15C.

Figure 15A:
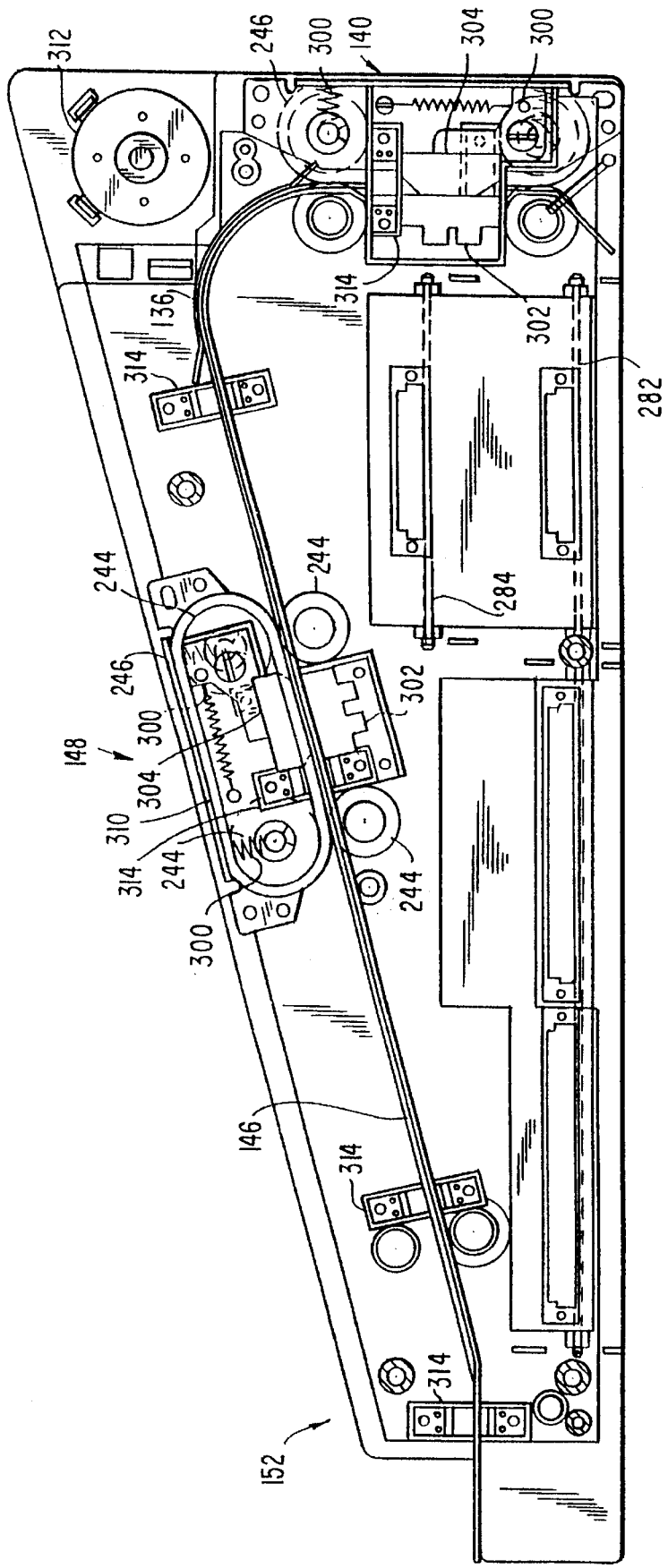
FIG. 15A is a side view, with the cover removed, of a feed module of the printer of FIG. 5.
Figure 15B:
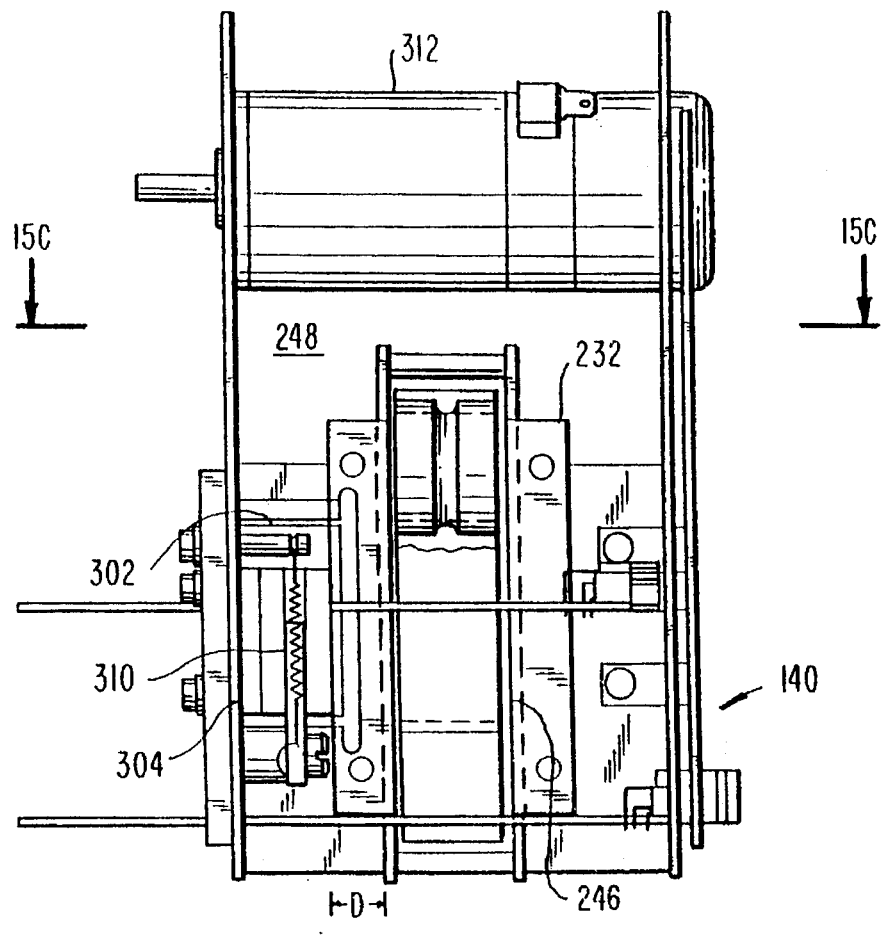
FIG. 15B is a rear elevational view, with the cover removed, of the feed module of FIG. 15A.
Figure 15C:
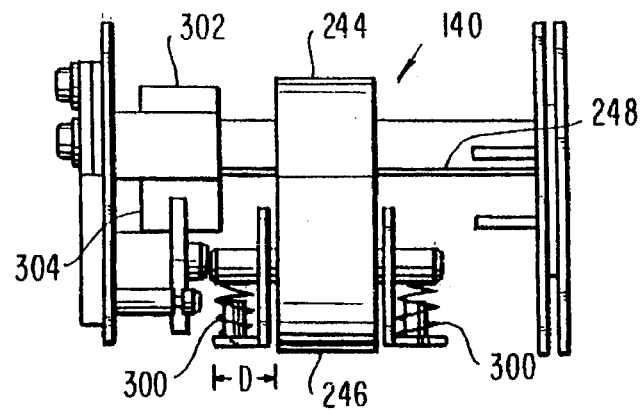
FIG. 15C is a partial plan cross-sectional view of the feed module of FIG. 15A taken along line 15C—15C of FIG. 15B.

FIG. 15A is a side elevation view of feed module 152 with its outer module wall removed. Module 152 includes magnetic read/write stations 140 and 148. Each station 140 and 148 includes a driving belt 246 carried on a first pair of rollers 244. A biasing means such as springs 300 urges belt 246 and its rollers 244 towards a second pair of rollers 244 so that belt 246 engages the second pair of rollers in order to drive ticket blanks 50.

Rollers 244 and driving belt 246 are disposed substantially in the center of the width of document guide 248 so as to engage ticket blanks 50 in an area A (FIG. 2) which is substantially in the center of the width of ticket blank 50.

Figure 16A:
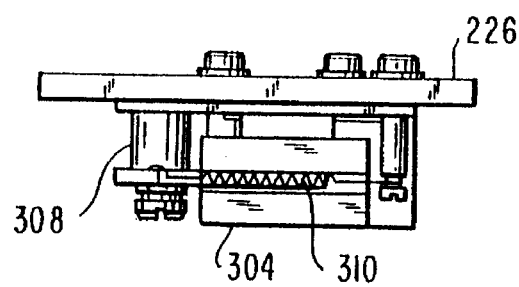
FIGS. 16A and 16B show details of a magnetic head and pressure pad assembly that make up parts of the feed module of FIG. 15A.
Figure 16B:
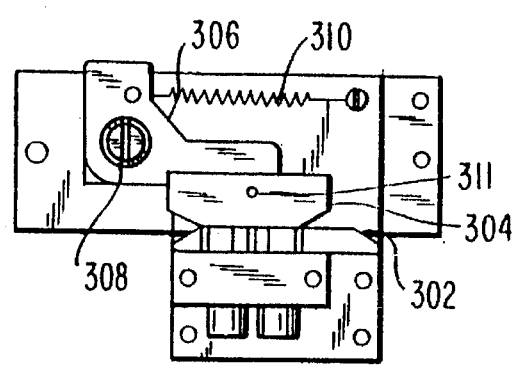

Each magnetic read/write station also includes a magnetic head 302 and a pressure pad 304. As best seen in FIGS. 16A and 16B, pressure pad 304 is mounted to pivot arm 306 which in turn is mounted on module wall 226 by means of pivot 308. Spring 310 biases pivot arm 306 so that it pivots to urge the pressure pad 304 into contact with magnetic head 302. The mounting of pressure pad 304 on pivot arm 306 is via gimbal pin 311. Pressure pad is fixedly mounted around pin 311, but an end of pin 311 is somewhat loosely mounted in pivot arm 306 allowing pad 304 a few degrees of movement in any direction. This arrangement effectively gimbals the pressure pad 304, so that it provides compliance to magnetic head 302 and ticket blanks 50 in more than one direction. Thus when a ticket blank 50 is driven through a magnetic read/write station, pressure pad 304 contacts the face of ticket blank 50 urging magnetic stripe 62 carried on the back of ticket blank 50 into contact with magnetic head 302 for recording of information on or reproducing of information from magnetic stripe 62.

Referring again to FIGS. 15B and 15C and to FIG. 2, it will be observed that magnetic head 302 and pressure pad 304 are offset a distance D along the width of document guide 248 from rollers 244 and drive belt 246. This distance D is sufficiently large so that the portion of ticket blank 50 bearing stripe 62 is free to flex independently from the portion of ticket bank 50 that is in contact with belt 246 and its opposed rollers 244. Pressure pad 304 is therefore able to act on ticket blank 50 so as to achieve satisfactory contact of magnetic strip 62 with magnetic head 302.

Feed module 152 includes a motor 312 for driving the various ticket feeding elements of module 152. Driving connections between motor 312 and the ticket feeding elements are not shown.

Module 152 also has a number of sensors 314, arranged at appropriate locations along feed path 136, for sensing the presence of a ticket 50 at the respective location. Connections for carrying signals between sensors 314 and electric components such as PWBs 282 and 284 are not shown.

As will be understood by those skilled in the art, feed modules 150 and 154, which are shown schematically in FIG. 6, have drive motors, ticket feeding elements such as pairs of opposed rollers or drive belts with opposed rollers, driving connections between the motors and the feeding elements, ticket position sensors, and so forth. For the most part, these elements are not shown in FIG. 6.

ELECTRONIC COMPONENTS

The electronic components of printer 44 will now be described in more detail, with reference to FIGS. 7 and 17.

As previously mentioned with respect to FIG. 7, printer 44 includes a mother board 196 which has a plurality of slots (for example, five slots). Slots 195 will accept PC/AT compatible printed circuit boards. Mother board 196 is arranged to provide interconnections among boards installed in slots 195, and between such boards and the feed modules, the print engine and other components of printer 44. Mother board 196 also includes non-volatile memory which may, for example, comprise 2K bytes of static RAM backed up with a lithium battery. As shown in FIGS. 7 and 17 a PC/AT card 192 and a printer electronics board 194 are installed in respective slots 195. Installed in another slot 195 is a special purpose peripheral card 340 such as a fax card, a LAN card or WAN card. Card 340 is compatible with the PC/AT standard bus (known as an "ISA" bus).

PC/AT card 192 may be specially designed for multi-microcomputer use, or may be a conventional 386SX PC/AT plug-in card that includes an Intel 80386SX microprocessor, an Intel 80387SX numeric coprocessor, 8 megabytes of DRAM, a BIOS EPROM, battery-backed-up 32K×8 SRAM, an expansion card with VGA and two RS-232 ports, a PC/AT chip set (such as that available from VLSI Technology known as the "Scamp" chip set that includes a model VL82C311 system controller and bus controller chip, and a model VL82C106 combo interface chip that includes two VL16C450 UARTS), a parallel printer interface, a Keyboard/mouse controller and a real time clock, a model WD37C65C floppy disk subsystem controller chip (available from Western Digital), and suitable bus connections between components of the PC/AT card.

If PC/AT card 192 is of the specially-designed type mentioned above, it may also include a bus-tie strap/connector 341 to eliminate bus contention when multiple microcomputer boards are in use on the same physical bus. This bus-tie strap/connector arrangement also accommodates a daughter board 339, which contains an optional VGA video subsystem and two additional serial ports. The daughter board 339 permits a complete PC/AT type microcomputer to fit into a single card slot 195, so that other slots are not required for video or additional serial ports.

PC/AT card 192 is connected to a terminal 40, which includes a display 342 and keyboard 346. Appropriate cabling connects keyboard 346 to PC/AT card 192, and another cable connects display 342 to daughter board 339. Terminal 40 may be used to control operation of, and exchange data with, printer 44.

PC/AT card 192 may also connected to a page printer 343, which it controls. PC/AT card 192 is also connected to, and controls, floppy disk drive 198 and a hard disk drive 344. One or more additional PC/AT cards 192' and terminals 40' (shown in phantom in FIG. 17) may be connected to printer 44 via remaining slots 195, so that a single printer 44 can easily be shared by several terminals 40.

Figure 17:
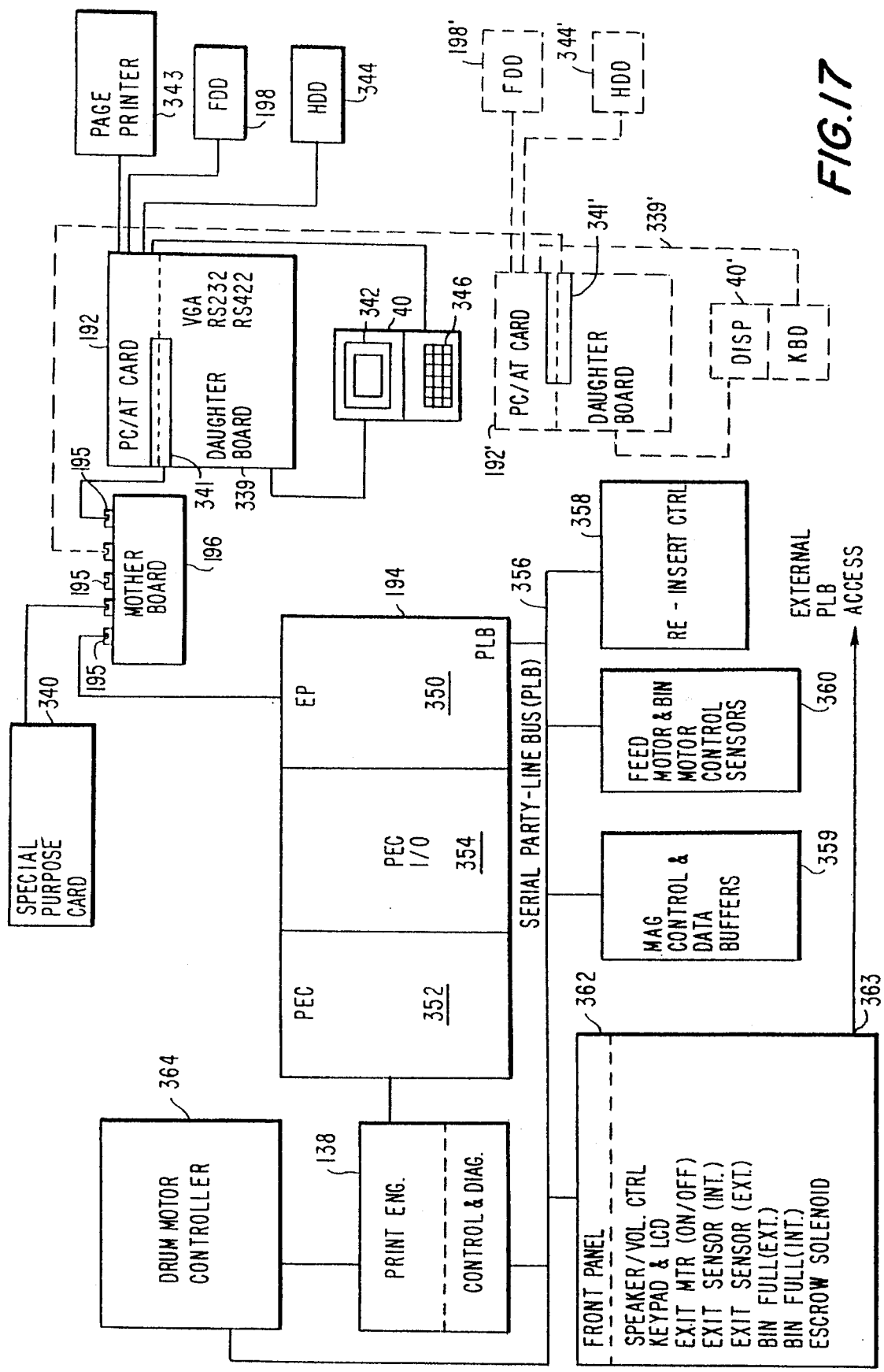
FIG. 17 is a block diagram that illustrates the electronic components of the printer of FIG. 5.

As shown in FIG. 17, printer electronics board 194 includes an executive processor (EP) section 350, a print engine control (PEC) section 352 and a print engine control I/O (PEC I/O) section 354.

EP 350 has a bi-directional data path connection via mother board 196 with PC/AT card 192, and serves as a communication link between printer 44 and PC/AT card 192. EP 350 preferably includes an Intel 80188 processor, 128K bytes of EPROM and 128K bytes of DRAM with hardware refresh. At least some non-volatile memory located on mother board 196 is addressable by EP 350, for internal storage of configuration parameters and error information.

PEC 352 preferably includes an Intel 80188 processor, 1 Mbyte of DRAM and a 64K ROM (or EPROM) for storing executable code, fonts and graphic images. PEC I/O 354 handles interchange of data between EP 350 and PEC 352. Additional executable code fonts and graphics may be downloaded for storage and use in PEC 352.

PEC 352 is connected to print engine 138 and controls the print head of print engine 138 to print graphics and bit mapped pixel images corresponding to data (in ASCII form, for example) received from EP 350.

Executive processor 350 is connected to serial party-line bus (PLB) 356 which is preferably a Phillips $I^2C$ bus. Executive processor 350 is connected through PLB 356 to the following the electronic components of printer 44: reinsert control electronics module 358; magnetic read/write control module 359; ticket movement electronics module 360; front panel electronics module 362; and drum motor controller 364.

Magnetic read/write control module 359 includes a Phillips 8XC552 microcontroller connected to an internal ROM and an external RAM. The microcontroller is in communication with EP 350 via PLB 356 and controls read and write operations of magnetic heads 302 of stations 140, 144 and 148.

Ticket movement module 360 includes a Phillips 8XC552 microcontroller with an internal ROM and RAM. This microcontroller controls all the drive motors for ticket feeding, including motors for picking tickets from cassettes 130 and 132. The same controller also receives signals from the various sensors that sense the presence of cassettes 130 and 132 or that sense presence of tickets in, or passage of tickets through, various parts of the ticket feed paths. This controller also is in communication with EP 350 via PLB 356.

Reinsert control module 358 is identical to module 360 in terms of hardware, but preferably has stored control software that is somewhat different from module 360's software.

Front panel electronics module 362 handles the input and output devices contained in the upper portion 104 of printer 44's front panel. Module 362 controls a solenoid that causes diversion of tickets to escrow bin 158 and also receives signals from sensors that indicate whether tickets have been properly ejected from printer 44 and whether the escrow bin 158 or an external storage bin (not shown) is full. (Use of an external storage bin with a ticket printer is well known and is described in U.S. Pat. No. 4,962,393, cited above.) Module 362 also receives signals that indicate whether doors of cabinet 100 are closed and locked, whether an external storage bin is present and plugged into printer 44 and whether there is a ticket jam at an exit point from printer 44. Module 362 also controls motors for ejecting tickets from printer 44.

Module 362 is in communication via PLB 356 with EP 350 and preferably includes a microcontroller of the 8051 family.

Module 362 is connected to a socket 363 (see also FIG. 5) through which external devices may be directly connected to PLB 356. Module 362 is also adapted to be connected to the electronics module of an external storage bin (not shown).

Drum motor controller 364 includes a microprocessor that communicates with EP 350 over PLB 356. Controller 364 is connected to print engine 138 and receives encoder signals that indicate the speed of the drum motor of print engine 138. Controller 364 is suitably connected to control the drum motor's speed and is also interfaced to a heater (if a thermal print engine is used) so as to control the drum temperature.

EP 350 is also connected by PLB 356 to control diagnostic circuitry of print engine 138.

While printer 44 is operable with only a single PC/AT card 192 installed in one of slots 195 to act as a front-end and console processor for printer 44, the specially-designed card 192 described above is such that several cards 192 may be installed in slots 195 for connection to a standard PC/AT (ISA) bus for independent and concurrent operation.

An important part of the design of the specially-designed cards 192 is the above-mentioned bus-tie strap 341 which allows cards 192 to be connected to the bus as masters controlling peripheral cards plugged into the bus. The bus-tie strap can be removed from a card 192, permitting the card 192 to operate independently and simultaneously with other cards connected to the bus without interference or contention.

In a preferred mode of operating printer 44, one PC/AT card 192 installed in a slot 195 serves as a system front-end or "master" processor, and has its bus-tie strap in place. Master PC/AT card 192 communicates with EP 350 through the ISA bus to control printer data streams and functions. (It will be understood that EP 350 is interfaced to the bus as an ISA peripheral board.) Master PC/AT card 192 also exchanges data with other peripheral cards for receiving host data, accessing disk drives, etc.

Other PC/AT cards 192 are installed in respective slots 195 but have their bus-tie straps removed to allow them to operate independently for providing console and PC functions to additional users. Each of the other cards 192 communicates with master PC/AT card 192 via RS232 serial ports, with the master PC/AT card 192 concentrating print data streams, buffering the data, and metering the data out to EP 350.

Preferably each card 192 has non-volatile (e.g. battery-backed-up) RAM on-board, for the purpose of preserving host data between the time it was received and the time of printing. In the event of a power outage, the data stream is thus preserved for resumption of printing when power is restored. This permits complete accounting for ticket blanks 50, which as noted before are to be strictly controlled.

MAGNETIC READ/WRITE OPERATIONS

Reading of information from, and writing of information upon, magnetic stripes 62 of ticket blanks 50 will now be described with reference to FIGS. 18A–18D.

Upon commencing a form feeding operation, it is first determined (step 1000) whether ticket blanks have been pre-staged to staging points 134 and 135. If not, a ticket blank is pre-staged to each staging point at which a ticket blank is not present (step 1002).

Following step 1002, or directly following step 1000, as the case may be, is step 1004, at which it is determined whether the form to be fed is one of the type stored in the primary bin (i.e. cassette 132). If not, a ticket blank is fed from staging point 135 (step 1006). Otherwise, a ticket blank is fed from staging point 134 (step 1008).

Following either step 1006 or step 1008, as the case may be, is step 1010, at which it is determined whether a stock control number (SCN) or other pre-encoded information is to be read from the ticket blank. If so, step 1012 follows at which the SCN or other information is read at the first read/write station (i.e. station 140). Following step 1012 is step 1014 at which it is determined whether the sensor (not shown) for the appropriate staging point is clear. In other words, a test is made to determine whether proper feeding to station 140 occurred. If not, an alarm is sounded (step 1016) and the feed routine ends to permit jam clearance, etc.

If the sensor was found to be clear at step 1014, then step 1018 follows, at which a blank from the appropriate cassette 130 or 132, as the case may be, is fed to the staging point from which a ticket blank has just been fed to station 140.

After step 1018 is step 1020, at which it is determined whether the reading of the SCN was successfully performed. If not, step 1021 follows, in which an alarm is sounded and the ticket is fed into escrow bin 158. The routine then ends. Alternately, at step 1021 the ticket may be fed to print engine 138 where "VOID" or a similar marking is printed on the ticket.

If at step 1020 it is found that the SCN was successfully read, step 1022 follows step 1020. At step 1022 it is determined whether information is to be written into the magnetic stripe 62 of the ticket blank which has just been read at read/write station 140. If so, the information is encoded and verified at the second station, i.e. station 148 (step 1024).

Following step 1024 is step 1026, at which it is determined whether the encoding of information successfully occurred at step 1024. If not, step 1028 follows, at which it is determined whether this was the third attempt to write information into the current ticket form. If so, an alarm is sounded (step 1030) and the routine ends to permit remedial action by the operator. Otherwise, step 1032 follows step 1028. At step 1032 the current ticket form is fed-backward and then passed again through station 148 in another attempt to record the information into magnetic stripe 62 (step 1034). Following step 1034, the routine returns again to step 1026 to determine whether the additional attempt was successful.

Again considering step 1026, if successful writing of information is found at that step, the routine proceeds to step 1036, at which the card is advanced through the feed path to print engine 138 and information is printed on the ticket form.

From step 1036 the routine proceeds to step 1038 at which it is determined whether the ticket just printed is the last one to be fed. If so, the feed routine ends. Otherwise, the routine proceeds to step 1040 to initiate an additional ticket form feed and print cycle. Thus after step 1040 the routine proceeds to step 1004 as previously described.

Returning again to consideration of step 1010, if at that step it was determined that SCN or other information was not to be read from the current ticket form, then the routine proceeds from step 1010 to step 1042, at which it is determined whether data is to be written into magnetic stripe 62 of the current ticket form. If not, the routine proceeds to step 1036, which was described above. Otherwise, the routine proceeds to step 1044, at which information is written by read/write station 140 onto magnetic stripe 62 of the current card.

Following step 1044 is step 1046, at which it is determined whether the staging point from which the ticket has just been fed is clear. If not, an alarm is sounded (step 1048) and the feed routine ends to permit jam clearance, etc. Otherwise, step 1050 follows step 1046. At step 1050 another ticket blank is fed from cassette 130 or 132, as the case may be, to refill the staging point from which the current ticket blank was just fed. Following step 1050 is step 1052, at which it is determined whether the write operation performed at step 1044 was successful. If not, the routine proceeds to step 1024, described above, so that writing can be attempted at read/write station 148. If at step 1052 the write operation at 1044 was found to be successful, then the routine proceeds to step 1036, also described above, for printing of the present ticket form.

REINSERTION OF OLD TICKETS

There will now be described, with reference to FIG. 19, a procedure in which a ticket is reinserted into printer 44.

The procedure begins with step 1100, in which a ticket is fed into printer 44 via reinsertion slot 112 (FIGS. 5 and 6). The ticket may be, for example, a ticket which has just been printed but on which an error has been found, or may be one that a customer is returning for credit. The reinserted ticket will sometimes be referred to as the "old ticket".

Returning to FIG. 19, step 1102 follows step 1100. At step 1102, the old ticket is fed along feed path 142 past magnetic read/write station 144. Information recorded on the magnetic strip of the old ticket is then read (step 1104). Following step 1104 is step 1106, at which it is determined whether the reading operation of step 1104 was successful.

If so, step 1107 follows, at which it is determined whether data recorded on the ticket is valid (i.e. contains proper codes, has not been tampered with, etc.). If the ticket is valid, step 1108 follows, at which it determined whether an overprinting operation is to be carried out in the old ticket. If so, new information, such as a new flight number and other data, a different seat number, or other data is printed on the old ticket (step 1109), assuming that there is available space on the old ticket. Alternatively, step 1109 may include printing "VOID" or a similar legend on the old ticket. It will be understood that the overprinting operation of step 1109 also includes recording of appropriate data on the old ticket's magnetic stripe.

After overprinting, the old ticket is advanced to outlet 48 for ejection from the printer 44 (step 1110).

Returning to step 1108, if it is determined at that step that the old ticket is not to be overprinted, step 1111 follows, during which the old ticket is fed along feed path 142 and common feed path section 146 to secure holding bin 158 (FIG. 6).

Figure 18A:
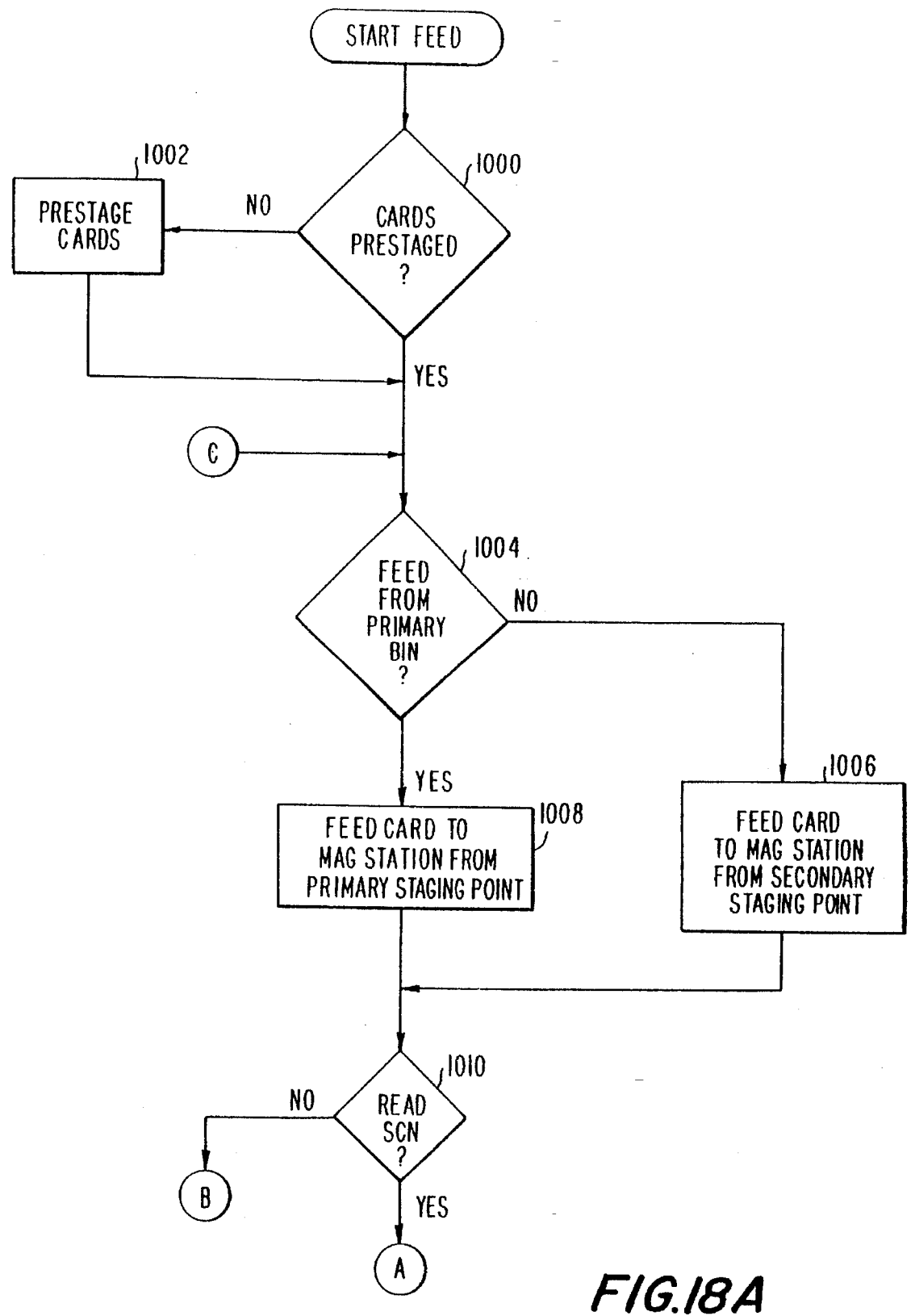
FIGS. 18A–18D are a flow chart that illustrates a procedure for printing and magnetically recording information on tickets by use of the printer of FIG. 5.
Figure 18B:
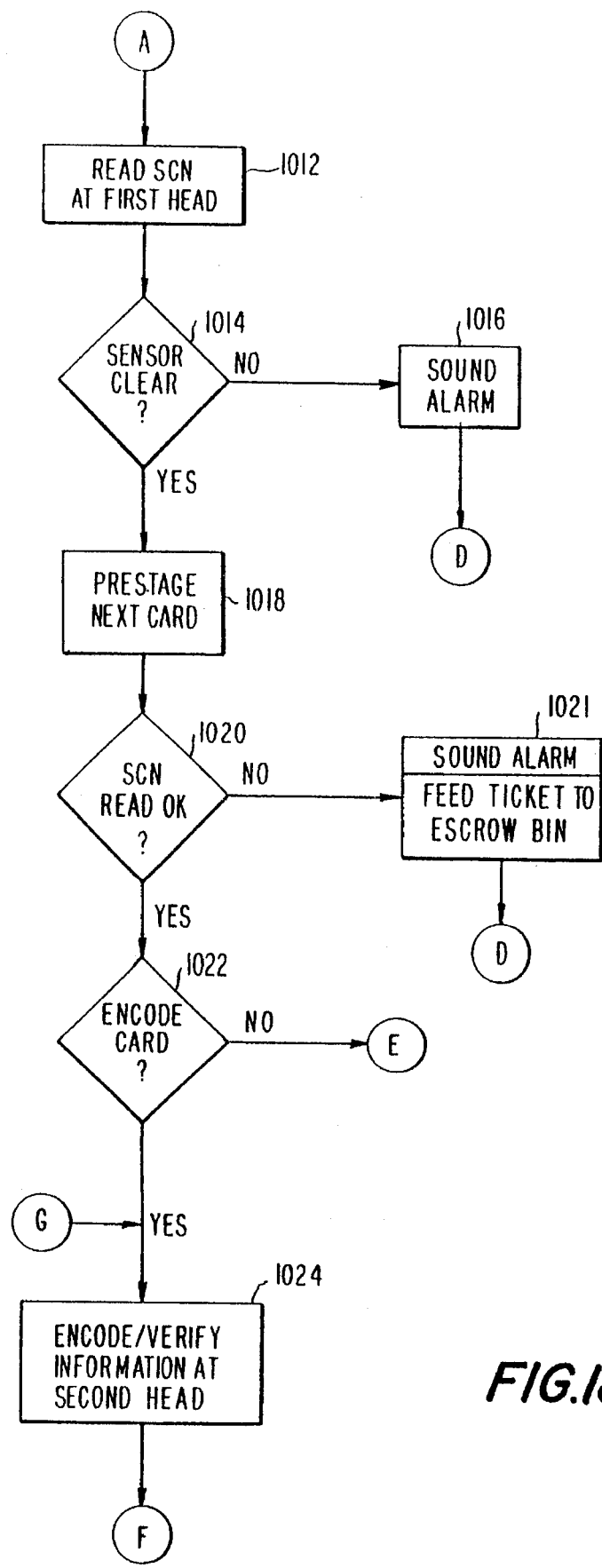
Figure 18C:
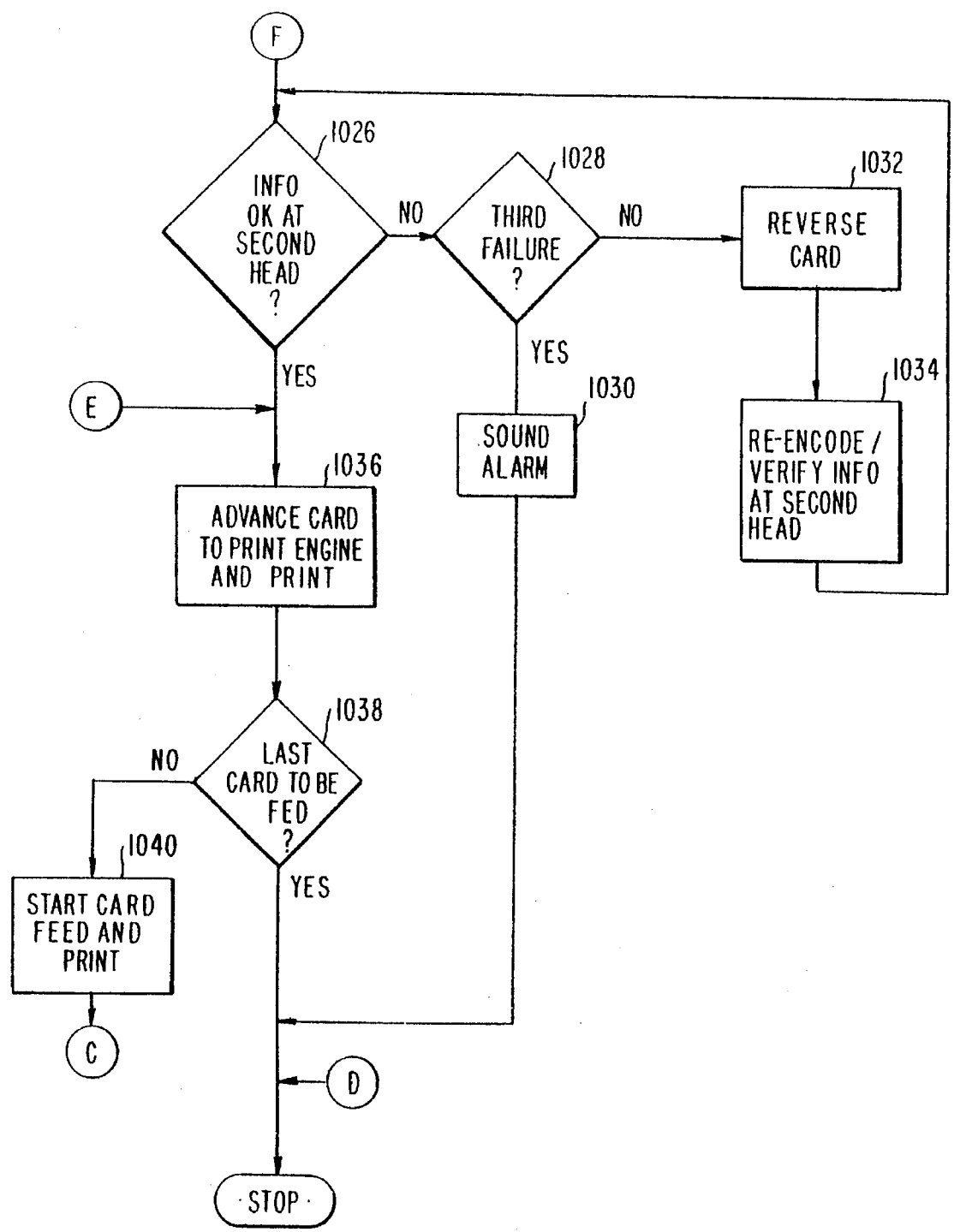
Figure 18D:
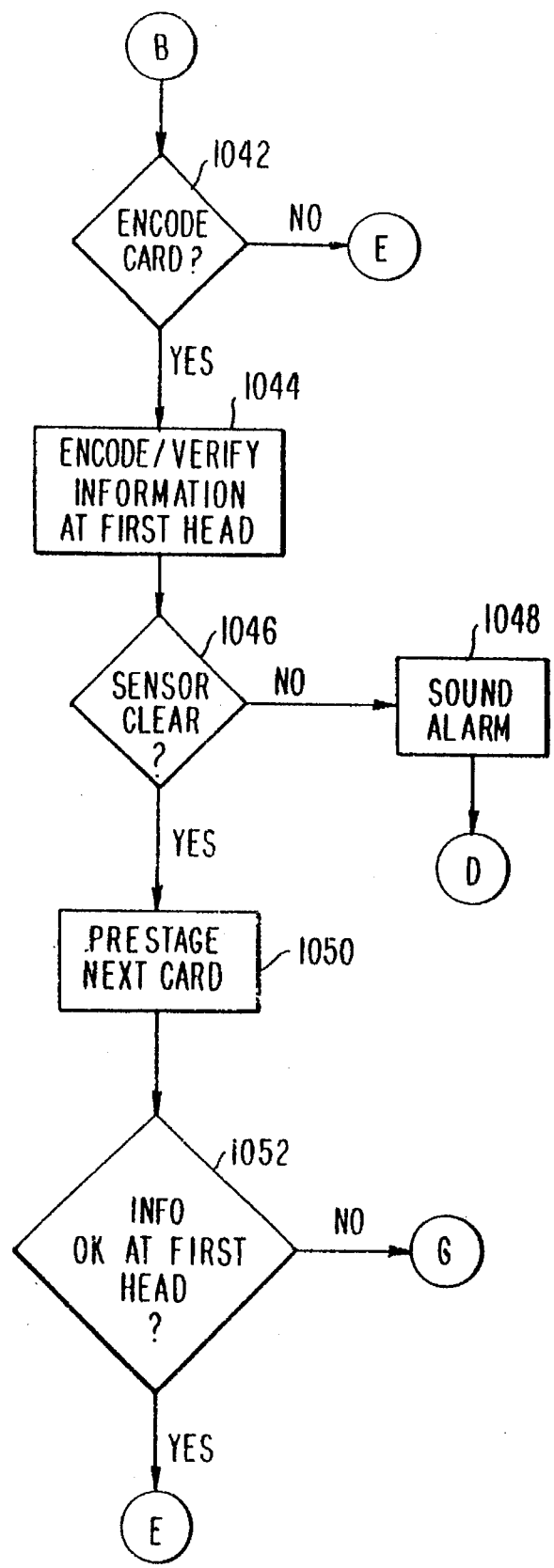

Following step 1111 is step 1112, at which a new ticket is printed in accordance with the procedure illustrated in FIGS. 18A–18B. The information read from the old ticket's magnetic strip at step 1104 (FIG. 19) is used in the magnetic recording operation with respect to the new ticket carried out in accordance with step 1024 (FIG. 18B) or step 1044 (FIG. 18D). Alternatively, or in addition to use of information read at step 1104 in a magnetic recording operation (step 1024 or 1044), information read from the old ticket's magnetic strip at step 1104 may be used in printing the new ticket as per step 1036 of FIG. 18C. Preferably the information printed and/or magnetically encoded on the new ticket also includes new information input via a terminal 40 connected to printer 44.

Again considering step 1107, if a that step the old ticket is not found to be valid, steps 1111 and 1112, as just described, follow step 1107.

Figure 19:
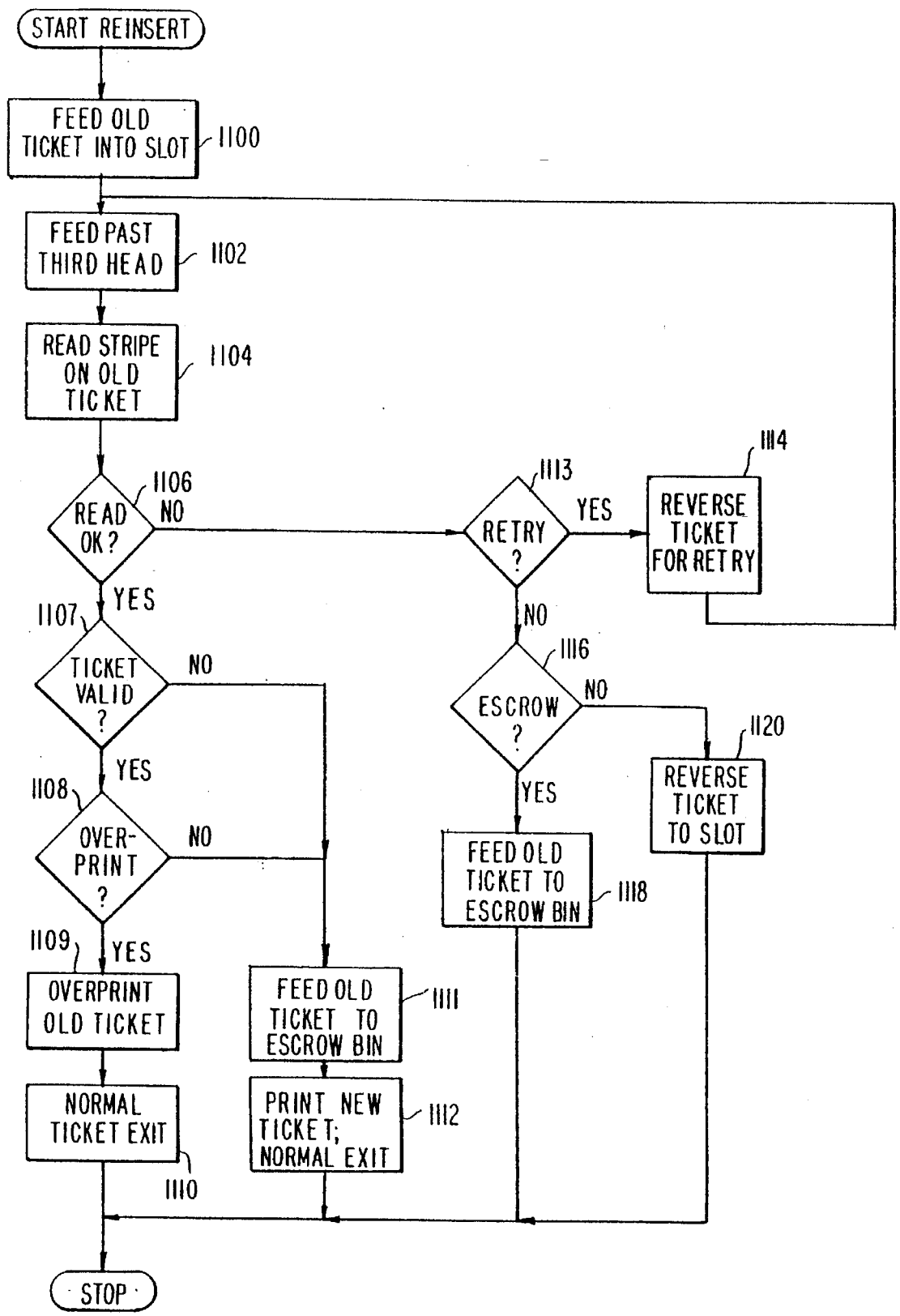
FIG. 19 is a flow chart that illustrates a procedure for recirculating an old ticket into the printer of FIG. 5 and using the printer to print a new ticket.

Returning now to step 1106 of FIG. 19, if it was determined at that step that the magnetic reading operation of step 1104 was not successful, step 1113 follows step 1106. At step 1113, it is determined whether reading of the old ticket's magnetic strip is to be attempted again. If so, step 1114 follows step 1113. At step 1114 the old ticket is driven in reverse along feed path 142 (FIG. 6), i.e. towards insertion slot 112, until the old ticket is in a position between slot 112 and magnetic read/write station 144. Step 1102 and so forth, as described above, then follow step 1114.

Returning again to step 1113, if it was determined at that step that reading of the old ticket's magnetic strip was not to be reattempted, then step 1116 follows step 1113. At step 1116, it is determined whether the old ticket is to be stored in secure holding or "escrow" bin 158. If so, the old ticket is fed along feed paths 142 and 146 to escrow bin 158 (step 1118). Otherwise, step 1120 follows step 1116. At step 1120 the old ticket is transported in a reverse direction along feed path 142 towards and out of insertion slot 112.

It will be recognized that the old ticket may be inserted again into slot 112 after it has been rejected as per step 1120. One reason why that might be done, for example, is if the ticket was initially inserted into slot 112 upside down, or otherwise oriented so that its magnetic stripe could not be read by the magnetic read/write station. If a ticket is reinserted, the routine of FIG. 19 is again carried out.

It should also be recognized that before or instead of feeding the old ticket to the escrow bin (as in step 1118), new information can be recorded on the old ticket's magnetic stripe, either at magnetic station 148, or, after reversing the old ticket, at station 144.

The above description of the invention is intended to be illustrative and not limiting. Various changes or modifications in the embodiments described may occur to those skilled in the art and these can be made without departing from the spirit or scope of the invention.

What is claimed is:

1. A transportation ticket printing device, said device comprising, in combination, a print engine, at least first and second storage bins for storing respective stacks of separate sheets of transportation ticket blanks, each having a magnetic storage area thereon, at least first and second feed devices for feeding said separate sheets from said each of said first and second bins, respectively, along first and second respective separate guide paths toward a common guide path leading to said print engine, at least one magnetic read/write station along said common guide path and a drive for moving respective separate sheets from each of said first and second storage bins to a separate staging point part way along its respective separate guide path, a holding device for holding said respective separate sheets at said respective separate staging points until a printing operation is to be performed on said respective separate sheets by said print engine.

2. A device as in claim 1 in which each of said bins is a different distance from a start location of said common guide path, and said separate staging points are adjacent said start location.

3. A device as in claim 1 in which each of said first and second storage bin comprises a ticket-blank holding cassette, and said separate sheets are separate ticket-blanks.

4. A method of printing magnetic record area-bearing transportation tickets by moving blank ticket card stock selectively from one of at least two sources of separate card stock to a print engine in a printing device for printing desired information on said separate card stock, said method comprising the steps of:

(a) moving separate card stock from a first storage location to a first staging location on a first guide path adjacent the entrance to a common guide path leading to a print engine;

(b) holding said separate card stock from said first storage location at said first staging location until a printing operation requiring that separate card stock is initiated;

(c) moving separate card stock from a second storage location to a second staging location on a second guide path adjacent the entrance to said common guide path leading to a print engine;

(d) holding said separate card stock from said second storage location at said second staging location until a printing operation requiring that card stock is initiated;

(e) selectively feeding said separate card stock from either said first or second staging location to said common guide path, past at least one magnetic read/write station while reading from and/or recording on said magnetic area, and then on to said print engine for printing upon demand, and (f) printing desired ticket information on said separate card stock.

5. A method as in claim 4 wherein said first and second guide paths are of different lengths.

* * * * *